(12) United States Patent
Wei et al.

(10) Patent No.: US 10,949,200 B2
(45) Date of Patent: Mar. 16, 2021

(54) METHODS AND APPARATUS FOR EXECUTING DATA-DEPENDENT THREADS IN PARALLEL

(71) Applicant: President and Fellows of Harvard College, Cambridge, MA (US)

(72) Inventors: Gu-Yeon Wei, Boston, MA (US); David M. Brooks, Cambridge, MA (US); Simone Campanoni, Brookline, MA (US); Kevin M. Brownell, Roxbury Crossing, MA (US); Svilen Kanev, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/898,894

(22) PCT Filed: Jun. 13, 2014

(86) PCT No.: PCT/US2014/042402
§ 371 (c)(1),
(2) Date: Dec. 16, 2015

(87) PCT Pub. No.: WO2015/050594
PCT Pub. Date: Apr. 9, 2015

(65) Prior Publication Data
US 2016/0313991 A1    Oct. 27, 2016

Related U.S. Application Data

(60) Provisional application No. 61/835,615, filed on Jun. 16, 2013.

(51) Int. Cl.
*G06F 9/30* (2018.01)
*G06F 8/41* (2018.01)
(Continued)

(52) U.S. Cl.
CPC ............ *G06F 9/3004* (2013.01); *G06F 8/452* (2013.01); *G06F 9/3009* (2013.01);
(Continued)

(58) Field of Classification Search
CPC .... G06F 15/17375; G06F 9/3004; G06F 9/30; G06F 2212/452; G06F 12/0875; G06F 11/36; G06F 8/452; G11C 5/05
See application file for complete search history.

(56) References Cited

U.S. PATENT DOCUMENTS 5,394,555 A    2/1995   Hunter et al.
6,253,292 B1 *  6/2001   Jhang ................ G06F 12/0813
                                                     709/218
(Continued)

OTHER PUBLICATIONS

PCT/US2014/042402, dated Mar. 6, 2015, Invitation to Pay Additional Fees.
(Continued)

*Primary Examiner* — John M Lindlof
(74) *Attorney, Agent, or Firm* — Wolf, Greenfield & Sacks, P.C.

(57) ABSTRACT

Methods and apparatus for parallel processing are provided. A multicore processor is described. The multicore processor may include a distributed memory unit with memory nodes coupled to the processor's cores. The cores may be configured to execute parallel threads, and at least one of the threads may be data-dependent on at least one of the other threads. The distributed memory unit may be configured to proactively send shared memory data from a thread that produces the shared memory data to one or more of the threads.

17 Claims, 8 Drawing Sheets

(51) Int. Cl.
  *G06F 9/38* (2018.01)
  *G06F 12/0875* (2016.01)
  *G06F 15/173* (2006.01)

(52) U.S. Cl.
  CPC ........ *G06F 9/30087* (2013.01); *G06F 9/3851* (2013.01); *G06F 12/0875* (2013.01); *G06F 15/17375* (2013.01); *G06F 2212/452* (2013.01)

(56) References Cited

U.S. PATENT DOCUMENTS

| | | | |
|---|---|---|---|
| 2002/0186667 A1* | 12/2002 | Mor | B01J 4/008 370/257 |
| 2003/0028755 A1* | 2/2003 | Ohsawa | G06F 9/3009 712/216 |
| 2004/0193841 A1 | 9/2004 | Nakanishi | |
| 2005/0044319 A1 | 2/2005 | Olukotun | |
| 2005/0240735 A1* | 10/2005 | Shen | G06F 12/0831 711/144 |
| 2006/0045120 A1* | 3/2006 | Mattina | H04L 12/43 370/460 |
| 2007/0074195 A1* | 3/2007 | Liao | G06F 8/443 717/160 |
| 2007/0174411 A1* | 7/2007 | Brokenshire | G06F 15/17337 709/213 |
| 2007/0180310 A1* | 8/2007 | Johnson | G06F 15/16 714/12 |
| 2008/0098208 A1* | 4/2008 | Reid | G06F 11/3636 712/234 |
| 2009/0043934 A1* | 2/2009 | Bjerregaard | H04L 45/06 710/244 |
| 2009/0240869 A1 | 9/2009 | O'Krafka et al. | |
| 2009/0271553 A1* | 10/2009 | Gang | G06F 11/3485 710/305 |
| 2010/0287326 A1* | 11/2010 | Chou | G06F 13/4022 710/316 |
| 2010/0306733 A1 | 12/2010 | Bordelon et al. | |
| 2011/0202700 A1* | 8/2011 | Inoue | G06F 13/385 710/305 |
| 2011/0238960 A1* | 9/2011 | Nakatomi | G06F 15/17375 712/225 |
| 2011/0265068 A1 | 10/2011 | Elnozahy et al. | |
| 2012/0124344 A1 | 5/2012 | Jarvis | |
| 2013/0070789 A1* | 3/2013 | Hara | G06F 15/17375 370/474 |
| 2014/0052923 A1* | 2/2014 | Ikeda | G06F 12/084 711/130 |
| 2014/0201326 A1* | 7/2014 | Joshua | G06F 12/0813 709/218 |
| 2015/0058832 A1* | 2/2015 | Gonion | G06F 8/433 717/150 |
| 2015/0117224 A1* | 4/2015 | Lih | H04L 12/437 370/238 |
| 2017/0085475 A1* | 3/2017 | Cheng | H04L 45/74 |

OTHER PUBLICATIONS

PCT/US2014/042402, dated May 18, 2015, International Search Report and Written Opinion.
International Search Report and Written Opinion for PCT/US2014/042402 dated May 18, 2015.
Invitation to Pay Additional Fees for PCT/US2014/042402 dated Mar. 6, 2015.
International Preliminary Report on Patentability in connection with International Application No. PCT/US2014/042402, dated May 18, 2015.

* cited by examiner

METHODS AND APPARATUS FOR EXECUTING DATA-DEPENDENT THREADS IN PARALLEL

RELATED APPLICATIONS

This application claims priority to PCT/US2014/042402, filed on Jun. 13, 2014, which claims priority under 35 U.S.C. § 119(e) to U.S. Provisional Application Ser. No. 61/835,615, entitled "METHODS AND APPARATUS FOR EXECUTING DATA-DEPENDENT THREADS IN PARALLEL" filed on Jun. 16, 2013, which is herein incorporated by reference in its entirety.

FEDERALLY SPONSORED RESEARCH OR DEVELOPMENT

This invention was made with government support under Grant No. NSF CCF 0903437 and Grant No. NSF IIS-0926148 awarded by the National Science Foundation. The government has certain rights in this invention.

BACKGROUND

Technical Field

The present disclosure relates to methods and apparatus for parallel processing. Some embodiments described in the present disclosure relate to techniques for parallelizing sequential code, and/or for parallel processing of threads having inter-thread data dependences.

Discussion of the Related Art

Techniques for automatic parallelization of sequential code into multithreaded code have been proposed. Such multithreaded code may be suitable for execution on a chip multiprocessor, multicore processor, shared-memory multiprocessor, and/or another processor with multiple processing units. In some cases, automatic parallelization may replace time-consuming, expensive, and/or error-prone manual parallelization by human programmers.

SUMMARY

According to an aspect of the present disclosure, a multicore processor is provided, comprising: a set of cores including first and second cores; and a distributed memory unit, including a set of memory nodes, the set of memory nodes including a first memory node coupled to the first core and a second memory node coupled to the second core, wherein the first core is configured to process one or more instructions of a first thread, the one or more instructions of the first thread including one or more producer instructions, and wherein processing the one or more producer instructions includes storing, in the first memory node, data shared by the first thread and a second thread, wherein the second core is configured to process one or more first instructions of the second thread in parallel with the first core processing the one or more instructions of the first thread, wherein the distributed memory unit is configured to send the shared data to the second memory node in response to the first core storing the shared data in the first memory node, and wherein the second core is configured to process one or more second instructions of the second thread after the second memory node stores the shared data sent by the distributed memory unit, wherein the one or more second instructions of the second thread include a consumer instruction, and wherein processing the consumer instruction includes loading the shared data from the second memory node.

According to an aspect of the present disclosure, a method of processing instructions in parallel on a multicore processor is provided, the multicore processor including a set of cores and a distributed memory unit, the set of cores including first and second cores, the distributed memory unit including a set of memory nodes, the set of memory nodes including a first memory node coupled to the first core and a second memory node coupled to the second core, the method comprising: processing one or more instructions of a first thread on the first core, wherein the one or more instructions of the first thread include one or more producer instructions, and wherein processing the one or more producer instructions includes storing, in the first memory node, data shared by the first thread and a second thread; in parallel with processing the one or more instructions of the first thread on the first core, processing one or more first instructions of the second thread on the second core; in response to the first core storing the shared data in the first memory node, sending the shared data to the second memory node; and after the second memory node stores the shared data, processing one or more second instructions of the second thread on the second core, wherein the one or more second instructions of the second thread include a consumer instruction, and wherein processing the consumer instruction comprises loading the shared data from the second memory node.

According to an aspect of the present disclosure, a method is provided, comprising: determining a value corresponding to parallel execution of multithreaded code on a multicore processor configured to send shared data from a first thread to a second thread in response to the first thread producing the shared data, wherein the multithreaded code implements a sequential portion of a program; selecting the sequential portion of the program for parallelization based, at least in part, on the determined value; and generating compiled code for the program, the compiled code including the multithreaded code corresponding to the sequential portion of the program.

According to an aspect of the present disclosure, a method is provided, comprising: identifying sequential loops in a program; generating portions of multithreaded code implementing the respective sequential loops; simulating execution of the portions of multithreaded code on a multicore processor configured to send shared data from a first thread to a second thread in response to the first thread producing the shared data, wherein simulating the execution of the portions of multithreaded code comprises determining simulated durations of execution of the portions of multithreaded code on the multicore processor; selecting one or more of the sequential loops for parallelization based, at least in part, on the simulated durations of execution of the portions of multithreaded code corresponding to the sequential loops; and generating compiled code for the program, the compiled code including the multithreaded code corresponding to the selected sequential loops.

BRIEF DESCRIPTION OF THE DRAWINGS

Various embodiments will be described with respect to the following Figures. It should be appreciated that the Figures are not necessarily drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
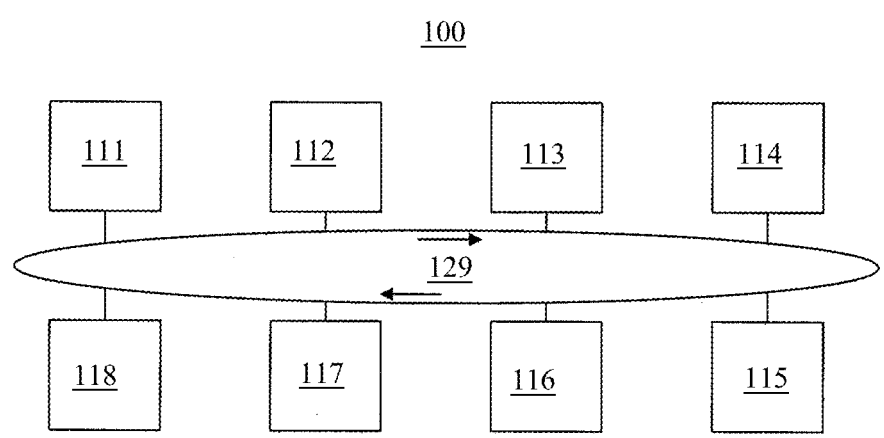
FIG. 1 shows a block diagram of a multicore processor 100, according to some embodiments.

Parallel processing techniques may be used to speed up the execution of software on a multicore processor, such that portions of the software are processed in parallel on the processor's cores. However, manual development of explicitly parallel software may be time-consuming, expensive, and/or error-prone. Parallelizing compilers may be used to automatically convert some sequential software into parallel software, but conventional parallel compilation techniques may be ineffective when applied to some types of sequential software. In some cases, automatically parallelized software executing on multiple cores of a multicore processor may actually perform worse than the corresponding sequential software executing on a single core of the multicore processor.

Thus, conventional automatic parallelization techniques may be inadequate when applied to difficult-to-parallelize sequential programs. The inventors have recognized and appreciated that difficult-to-parallelize sequential programs may include (1) small loops (e.g., loops characterized by iterations that complete in 25 or fewer clock cycles), (2) loops with loop-carried dependences between nonconsecutive loop iterations (e.g., loop-carried dependences arising when shared data is produced by a first loop iteration and consumed by at least one loop iteration other than the first loop iteration's successor), (3) loops with loop-carried dependences between a first loop iteration and multiple other loop iterations (e.g., loop-carried dependences arising when shared data is produced by a first loop iteration and consumed by multiple other loop iterations), and/or (4) loops with data-dependent loop-carried dependences (e.g., loops in which the existence of a loop-carried dependence between two loop iterations depends on the data being processed, and therefor may not be determinable or predictable at compile-time).

The inventors have recognized and appreciated techniques for facilitating automatic parallelization of difficult-to-parallelize sequential programs. In some embodiments, a distributed memory unit may be used to send shared data produced by a loop iteration from the core processing the loop iteration to one or more cores processing other iterations of the same loop. In some embodiments, the distributed memory unit may provide low-latency core-to-core communication, such that the shared data may be sent quickly from a first core to a second core. Such low-latency core-to-core communication of shared data may facilitate automatic parallelization of small loops by reducing the durations of time periods during which cores stall the processing of loop iterations to wait for the arrival of shared data produced by loop iterations executing on other cores.

In some embodiments, the distributed memory unit may proactively send shared data produced by a loop iteration from the core processing the loop iteration to one or more other cores processing iterations of the same loop, without waiting for the other cores to request the shared data. Such proactive communication of shared data may facilitate automatic parallelization of small loops by further reducing stalls associated with waiting for the arrival of shared data.

In some embodiments, the distributed memory unit may broadcast shared data produced by a loop iteration from the core processing the loop iteration to all other cores processing iterations of the same loop. By sending the shared data to all cores which could potentially consume the data, such broadcasting may facilitate automatic parallelization of loops having loop-carried dependences between nonconsecutive loop iterations, loop carried-dependences between a first loop iteration and multiple other loop iterations, and/or data-dependent loop-carried dependences, In some embodiments, the communication of shared data among cores may be decoupled from the processing occurring on the cores, such that communication of shared data and parallel processing of instructions are substantially overlapped.

The performance of automatically parallelized software may depend on which portions (e.g., loops) of the software execute in parallel and which portions of the software execute sequentially. In some embodiments, a parallelizing compiler may determine which portions of a program execute in parallel and which portions of the program execute sequentially based, at least in part, on simulations of portions of the program executing in parallel on a multicore processor which uses a distributed memory unit to synchronize the threads and/or share data among the threads.

Using one or more of these techniques may facilitate automatic parallelization of difficult-to-parallelize sequential programs, such that an automatically parallelized version of the program executing on a multicore processor may perform better than the sequential version of the program.

The various aspects described above, as well as further aspects, will now be described in detail below. It should be appreciated that these aspects may be used alone, all together, or in any combination of two or more, to the extent that they are not mutually exclusive.

1. Terminology

As used herein, a "processing core" or "core" may include a portion of a processor. In some embodiments, a core may be capable of fetching, decoding, and executing instructions of a computer program. In some embodiments, separate cores on a processor may be capable of simultaneously processing (e.g., fetching, decoding, and/or executing) instructions from different computer programs, or from different portions of a same computer program.

As used herein, "shared data" may include any suitable data produced (e.g., generated, written, and/or stored) by a thread and consumed (e.g., used, read, and/or loaded) by another thread. In some embodiments, shared data may be produced, without limitation, by instructions that store data to memory, instructions that write data to registers, and/or synchronization instructions (e.g., 'signal' instructions). In some embodiments, shared data may be consumed, without limitation, by instructions that load data from memory, instructions that read data from registers, and/or synchronization instructions (e.g., 'wait' instructions). In general, shared data may be communicated between threads through registers and/or through the memory system. In some embodiments, shared data may be communicated between threads only through the memory system (which may include a distributed memory unit).

As used herein, a "producer instruction" may include any instruction that may produce shared data, including, without limitation, a store instruction and/or a 'signal' instruction.

As used herein, a "consumer instruction" may include any instruction that may consume shared data, including, without limitation, a load instruction and/or a 'wait' instruction.

As used herein, "a loop-carried dependence" may include any dependence that may arise between different iterations of a loop, including, but not limited to, a data dependence that may arise from a later loop iteration consuming shared data produced by an earlier loop iteration.

As used herein, a "sequential code segment" (or "sequential segment") may include, without limitation, a set of one or more instructions which may produce and/or consume shared data. In some embodiments, parallel threads executing sequential code segments may be constrained, through synchronization, to execute sequential code segments sequentially (e.g., a logically later thread may be constrained to execute a sequential segment that can access shared data at a particular memory address only after all logically earlier threads have completed their corresponding sequential code segments or have determined that the paths containing their corresponding sequential code segments will not be executed).

In some embodiments, a thread may include multiple sequential segments. The multiple sequential segments may be arranged such that all accesses to a given shared memory address occur within a same sequential segment, and no shared memory address is accessed by two different sequential segments. In some embodiments, synchronization data associated with the synchronization instructions may indicate which sequential segment is referenced by the corresponding synchronization instruction.

As used herein, "synchronization instructions" may include instructions used to synchronize execution of portions (e.g., sequential segments) of parallel threads. In some embodiments, synchronization instructions may include, without limitation, 'signal' instructions and/or 'wait' instructions. In some embodiments, the execution of a 'signal' instruction by a first thread may indicate to logically later threads that the first thread has completed execution of a sequential segment (and/or that the thread will not execute a sequential segment), and the execution of a 'wait' instruction by a second thread may stall the second thread until all earlier threads have executed corresponding 'signal' instructions. In some embodiments, the execution of a 'signal' instruction by a first thread may indicate to logically later threads that the first thread and all logically earlier threads have completed execution of a sequential segment (and/or will not execute the sequential segment), and the execution of a 'wait' instruction by the first thread may stall the first thread until the first thread's logical predecessor thread has executed a corresponding 'signal' instruction.

2. A Parallel Processing Framework

For ease of illustration, aspects of the present disclosure are described below in the context of a ring-based parallel processing framework on a multicore processor. However, the techniques described herein may be applied to any suitable parallel processing framework, and some embodiments are not limited to ring-based frameworks. Likewise, the techniques described herein may be applied to any suitable parallel processing system, and some embodiments are not limited to multicore processors.

FIG. 1 illustrates a block diagram of a multicore processor 100, according to some embodiments. In the example of FIG. 1, multicore processor 100 includes a network 129 and eight processor cores 111-118 coupled to the network. In some embodiments, network 129 may be a ring network, including, without limitation, a unidirectional ring network. In some embodiments, multicore processor 100 may include any suitable number of cores (e.g., 2 cores, 4 cores, 8 cores, tens of cores, 16 cores, 32 cores, 64 cores, hundreds of cores, or thousands of cores). Multicore processor 100 may be configured to execute threads in parallel on cores 111-118. The threads that execute in parallel on the cores may include threads spawned by an explicitly parallel program, threads extracted from a sequential program by a parallelizing compiler, and/or any other suitable threads.

In some embodiments, multiple iterations of a loop may execute in separate threads on separate cores of multicore processor 100. In some embodiments, the cores may form a logical ring, and the threads may be arranged in logical order around the logical ring of cores, with threads corresponding to earlier loop iterations preceding threads corresponding to later loop iterations in the logical ring order. For example, in some embodiments, the thread corresponding to loop iteration N may execute on core 113, the thread corresponding to loop iteration N+1 may execute in parallel on core 114, the thread corresponding to loop iteration N+2 may execute in parallel on core 115, and so on, with the thread corresponding to loop iteration N+7 executing in parallel on core 112. In some embodiments, the ordering of the cores around the logical ring may match the ordering of the cores around ring network 129.

In some embodiments, the loop may exhibit one or more loop-carried dependences, such that one or more of the loop-iteration threads may be data-dependent on one or more other loop-iteration threads executing in parallel on multicore processor 100. In particular, one or more threads corresponding to later loop iterations may be data-dependent on one or more parallel threads corresponding to earlier loop iterations. The direction in which communication flows around ring network 129 may match the direction in which shared data flows around the logical ring of loop-iteration threads.

Figure 2B:
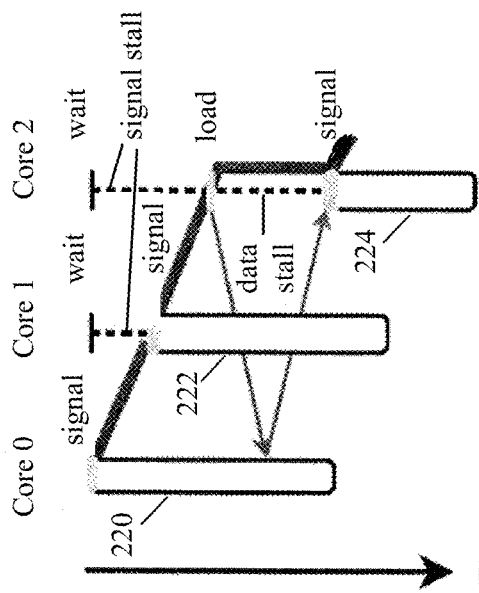
FIG. 2B shows parallel execution of iterations of loop 200, according to some techniques.
Figure 2A:
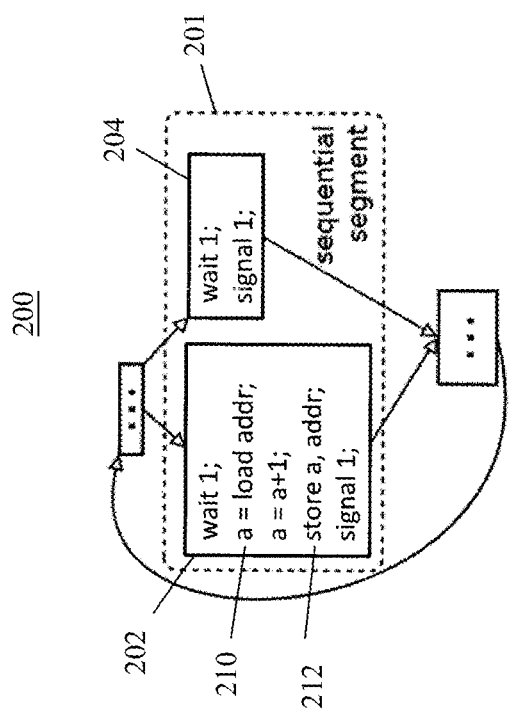
FIG. 2A shows an example of a loop 200 with a loop-carried data dependence.

FIGS. 2A-2B illustrate a technique for executing iterations of a loop in parallel, where the loop includes a loop-carried dependence. In the example of FIGS. 2A-2B, communication of shared data among threads is reactive, and synchronization is coupled to computation. FIG. 2A shows an example, abstracted for clarity, of a small loop 200, which may be responsible for a large portion of the total execution time of a program. Loop 200 includes a code segment 201 with two possible execution paths, 202 and 204. The instructions in path 202 give rise to an actual loop-carried dependence. In particular, instruction 210 loads, from an address 'addr', a value stored to address 'addr' by instruction 212 during a previous iteration of the loop. By contrast, the instructions in path 204 do not give rise to an actual loop-carried dependence.

To ensure that all actual loop-carried dependences between iterations of loop 200 are enforced, a compiler may assume that instruction 210 always depends on a value produced by the previous loop iteration. Thus, the compiler may synchronize execution of code segment 201 in successive iterations by inserting synchronization instructions (e.g., 'wait' and 'signal' instructions) in suitable locations (e.g., along all paths through the code segment, including paths 202 and 204). Such synchronization has the effect of coupling the computation performed by each loop iteration to the synchronization of the loop iterations, because a successor loop iteration cannot process code segment 201 until the predecessor iteration has completed code segment 201, even if the predecessor iteration takes path 204 through code segment 201 and therefore is not a source of an actual loop-carried dependence.

FIG. 2B shows parallel execution of three iterations of loop 200 on a multicore processor in which communication of shared data among threads is reactive, and synchronization is coupled to computation. In the example of FIG. 2B, a first loop iteration 220, which executes on core 0, takes path 202 through code segment 201 and therefore stores a value to address 'addr'. Second loop iteration 222, which executes on core 1, takes path 204 through code segment 201 and therefore does not access address 'addr'. Third loop iteration 224, which executes on core 2, takes path 202 through code segment 201, and therefore loads the value stored at address 'addr'. As can be seen in FIG. 2B, second iteration 222 waits for first iteration 220 to execute its 'signal' instruction, indicating that first iteration 220 has completed code segment 201, before second iteration 222 sends executes its 'signal' instruction and sends the corresponding synchronization data to third iteration 224, indicating that second iteration 222 has completed code segment 201—even though second iteration 222 does not access the shared data at address 'addr'. Likewise, third iteration 224 waits for synchronization data from second iteration 222, indicating that second iteration 222 has completed code segment 201, before third iteration 224 processes the instructions on path 202. When third iteration 224 executes load instruction 210, core 2 stalls while the value stored to address 'addr' by first iteration 200 is retrieved from core 0.

Hence, two sets of stalls may slow down the chain of computation in FIG. 2B. First, the synchronization performed by the second iteration 222 (waiting for first iteration 220 to complete code segment 201) is unnecessary, because the path taken by the second iteration through code segment 201 contains only parallel code. Second, lazy forwarding of the shared data for core 0 to core 2 leads to a data stall, because the transfer of the shared data only begins when the data is requested (by load instruction 210 in the third iteration), rather than when the data is generated (by store instruction 212 in the first iteration 220). These stalls drag down the performance of loop 200.

Figure 3B:
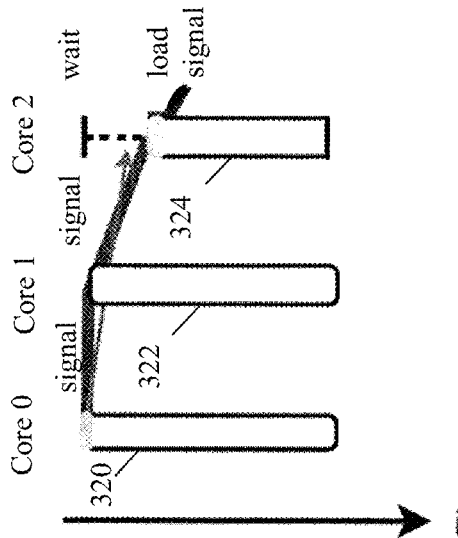
FIG. 3B shows parallel execution of iterations of a loop 300, according to some embodiments.
Figure 3A:
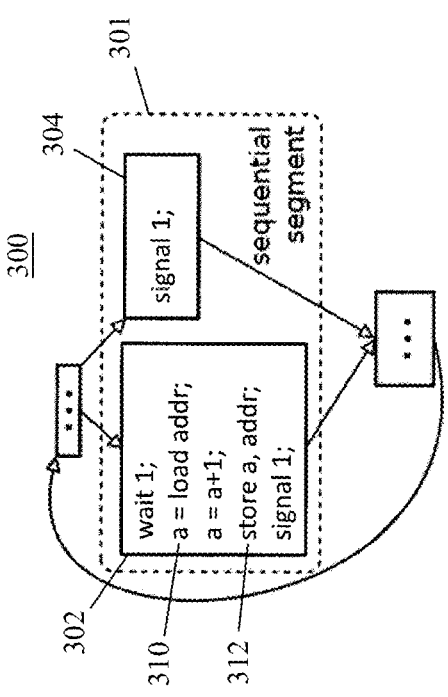
FIG. 3A shows an example of a loop 300 with a loop-carried data dependence.

FIGS. 3A-3B illustrate how decoupling synchronization from computation and proactively transmitting shared data can improve the performance of threads executing iterations of a loop in parallel. FIG. 3A shows an example, abstracted for clarity, of a small loop 300. The only difference between loop 300 and loop 200 is that loop 200 includes a 'wait' instruction along path 204 through code segment 201, whereas loop 300 does not include a 'wait' instruction along path 304 through code segment 301.

FIG. 3B shows parallel execution of three iterations of loop 300 on a multicore processor that proactively forwards shared data and decouples synchronization from computation, according to some embodiments. In the example of FIG. 3B, first loop iteration 320, which executes on core 0, takes path 302 through code segment 301 and therefore stores a value to address 'addr'. Second loop iteration 322, which executes on core 1, takes path 304 through code segment 301 and therefore does not access address 'addr'. Third loop iteration 324, which executes on core 2, takes path 302 through code segment 301, and therefore loads the value stored at address 'addr'. As can be seen in FIG. 3B, second iteration 322 sends a signal to third iteration 324, indicating that second iteration 322 has completed code segment 301, without waiting for a signal indicating that first iteration 320 has completed code segment 301, because second iteration 322 does not access the shared data at address 'addr' and therefore does not need to synchronize with first iteration 320. Thus, the signal stall period in FIG. 3B during which the third iteration 324 waits to synchronize with the earlier iterations is shorter than the signal stall period in FIG. 2B during which iteration 2 (224) waits to synchronize with the earlier iterations.

As can further be seen in FIG. 3B, the data stored to address 'addr' by first iteration 320 is proactively forwarded to second iteration 322 and third iteration 324, before iteration 2 loads from address 'addr'. Thus, there is no data stall period in FIG. 3B, in contrast to the lengthy data stall period in FIG. 2B. By reducing the synchronization stall period and eliminating the data stall period, the techniques illustrated in FIG. 3B may significantly boost the performance of the illustrated loop.

FIGS. 3A-3B illustrate a non-limiting example of how two of the above-described techniques (e.g., decoupling of synchronization from computation, and proactively sending shared data to parallel threads in response to the production of the shared data) can boost the performance of a parallelized loop. In some embodiments, any one or more of the above-described techniques may be used to boost the performance of a parallel program (e.g., an automatically parallelized parallel program).

3. Distributed Memory Unit

Figure 4:
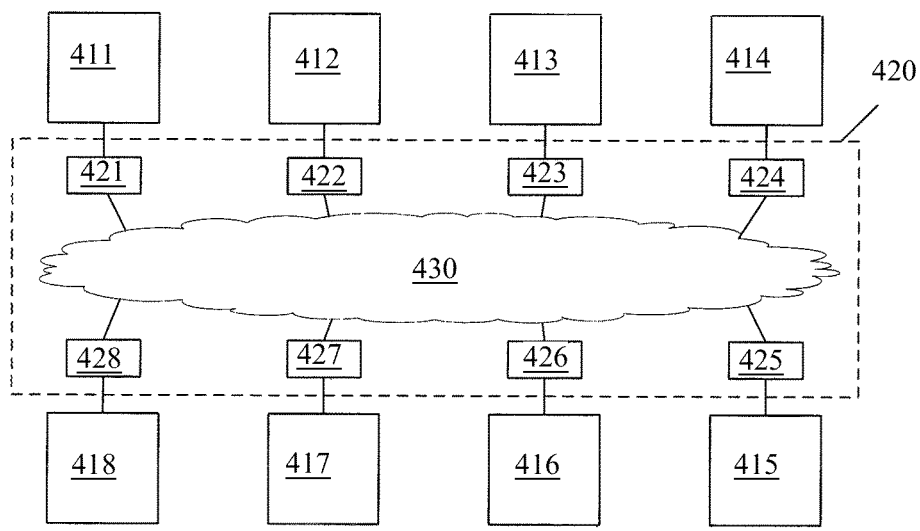
FIG. 4 shows a block diagram of a multicore processor which includes a distributed memory unit, according to some embodiments.

FIG. 4 illustrates a block diagram of a multicore processor 400, according to some embodiments. In the example of FIG. 4, multicore processor 400 includes a distributed memory unit 420 and eight processor cores 411-418 coupled to the distributed memory unit. In some embodiments, multicore processor 400 may include any suitable number of cores (e.g., 2 cores, 4 cores, 8 cores, tens of cores, 16 cores, 32 cores, 64 cores, hundreds of cores, or thousands of cores). In some embodiments, the cores may have any suitable width (e.g., a width between one and eight instructions, or a width greater than eight instructions) at any stage of a processing pipeline, may be pipelined to any suitable depth (e.g., a depth between two and thirty stages, or a depth greater than 30 stages), and may execute instructions using any suitable processing paradigm (e.g., in-order, out-of-order, SIMD, MIMD, vector, VLIW, RISC, and/or CISC), Multicore processor 400 may be configured to execute any suitable threads in parallel on cores 411-418, including, but not limited to, threads spawned by an explicitly parallel program, threads corresponding to different iterations of a same loop, and/or threads extracted from a sequential program by a parallelizing compiler.

In some embodiments, distributed memory unit 420 may include memory nodes 421-428 and interconnects 430 coupling the memory nodes. In the example of FIG. 4, distributed memory unit 420 includes eight memory nodes 421-428. In some embodiments, distributed memory unit 420 may include any suitable number of memory nodes (e.g., 2 memory nodes, 4 memory nodes, 8 memory nodes, 16 memory nodes, 32 memory nodes, 64 memory nodes, hundreds of memory nodes, thousands of memory nodes, a number of memory nodes equal to the number of cores, and/or a number of memory nodes that differs from the number of cores).

Distributed memory unit 420 may be configured to perform one or more operations, including, without limitation, caching and/or routing shared data (e.g., shared memory data and/or synchronization data). In some embodiments, distributed memory unit 420 may be configured to cache shared data (including, without limitation, shared memory data and/or synchronization data) in the memory nodes. In some embodiments, distributed memory unit 420 may be configured to route shared data among the memory nodes over the interconnects 430. By caching and/or routing shared data, distributed memory unit 420 may facilitate enforcement of dependences among threads and/or synchronization of the threads.

Distributed memory unit 420 may be configured to route shared data in any suitable way, including, without limitation, proactively sending shared data, broadcasting shared data, and/or decoupling communication of shared data from computation on the cores of multicore processor 400. In some embodiments, distributed memory unit 420 may be configured to proactively send shared data from a memory node coupled to a core on which the shared data was produced to a memory node coupled to one or more cores by which the shared data may be consumed, without waiting for other cores to request the shared data. In some embodiments, distributed memory unit 420 may be configured to broadcast shared data from a memory node coupled to a core on which the shared data was produced to one or more (e.g., all) other memory nodes.

In some embodiments, distributed memory unit 420 may decouple synchronization from computation by sending synchronization data from a first memory node coupled to a first core executing a first thread to one or more memory nodes coupled to one or more cores executing logically later threads in response to the first thread executing a 'signal' instruction corresponding to a first sequential segment, even if one or more threads logically earlier than the first thread have not yet executed 'signal' instructions corresponding to the first sequential segment. In some embodiments, distributed memory unit 420 may route the synchronization data among the memory nodes in parallel with continued computation on the processor cores, such that the synchronization data are routed without interrupting the cores or occupying the cores' computational resources.

In some embodiments, distributed memory unit 400 may include a ring cache, as described in Campanoni et al., HELIX-RC: An Architecture-Compiler Co-Design for Automatic Parallelization of Irregular Programs, International Symposium on Computer Architecture (ISCA), 2014.

3.1. Memory Node Architecture

Figure 5:
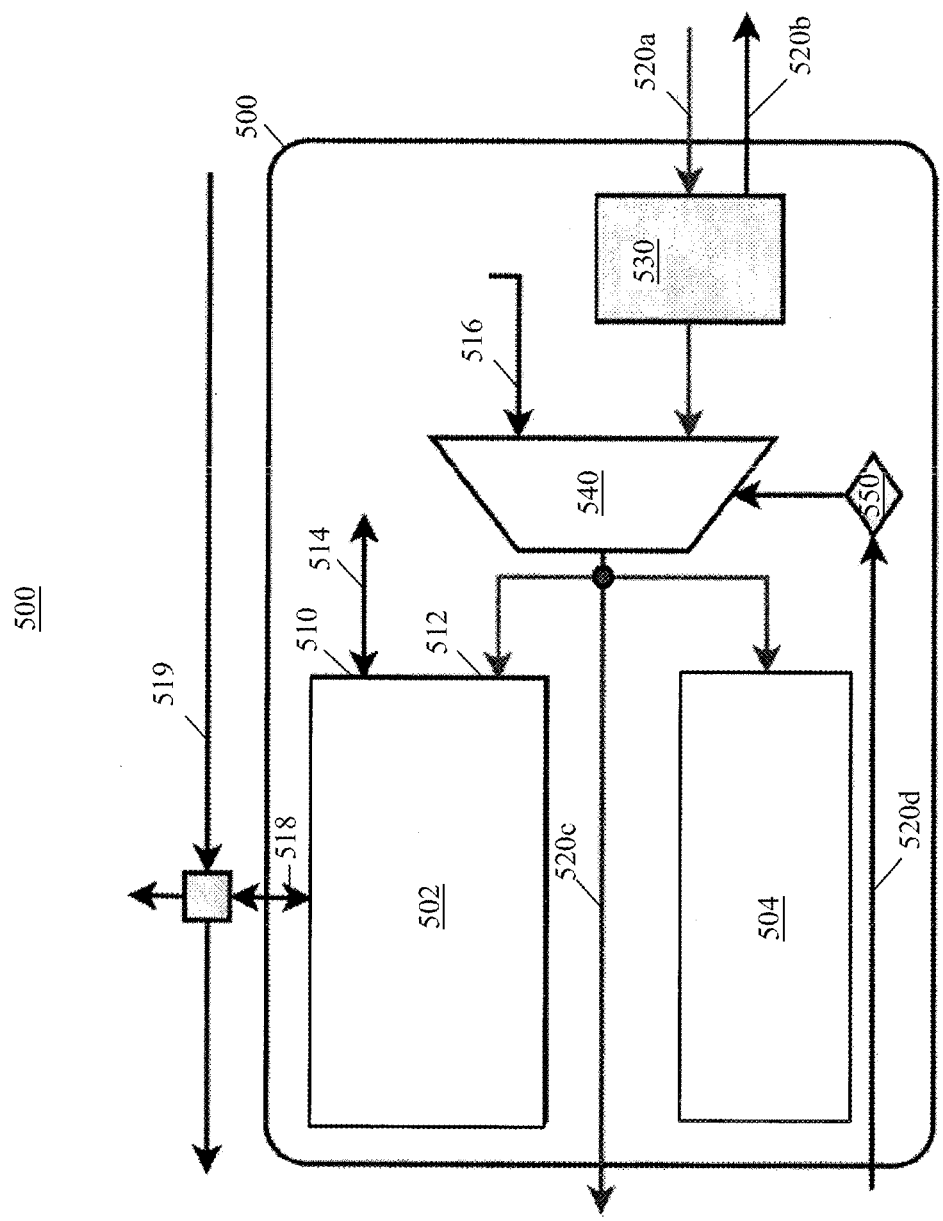
FIG. 5 shows a schematic of a memory node of a distributed memory unit, according to some embodiments.

FIG. 5 shows a schematic of a memory node 500 of a distributed memory unit 420, according to some embodiments. In some embodiments, memory node 500 may include a shared memory cache 502. Shared memory cache 502 may cache shared memory data (e.g., memory addresses and/or values of shared memory data), including shared memory data received from one or more processing cores, shared memory data received from one or more other memory nodes 500, shared memory data received from the cache-memory hierarchy of multicore processor 400, and/or shared memory data received from any other suitable source.

The following is a non-limiting description of the manner in which shared memory cache 502 may be organized. The capacity of shared memory cache 502 may include, without limitation, 8 KB or more of shared memory data, between 2 KB and 8 KB of shared memory data, between 256 bytes and 2 KB of shared memory data, or less than 256 bytes of shared memory data. Shared memory cache 502 may have any suitable associativity, including, without limitation, 2-way set associativity, 4-way set associativity, 8-way set associativity, or greater than 8-way set associativity. The line size of shared memory cache 502 may include, without limitation, one word per line, two words per line, and/or more than two words per line. While the small line size may be atypical of conventional cache designs, smaller line sizes may reduce the frequency of false data sharing by independent words in the same cache line. The replacement policy of shared memory cache 502 may include, without limitation, a least recently used (LRU) replacement policy, and/or any other suitable replacement policy.

The following is a non-limiting description of the communication ports and bandwidth of shared memory cache 502. Shared memory cache 502 may have any suitable number of read ports 510, including, without limitation, 1 read port, 2 read ports, or more than 2 read ports. The read port(s) 510 may be coupled to one or more processor cores through core-node load link 514. Shared memory cache 502 may have any suitable maximum read bandwidth, including, without limitation, maximum read bandwidth of one word per cycle, two words per cycle, between three and six words per cycle, or more than six words per cycle. Shared memory cache 502 may have any suitable number of write ports 512, including, without limitation, 1 write port, 2 write ports, or more than 2 write ports. Shared memory cache 502 may have any suitable maximum write bandwidth, including, without limitation, maximum write bandwidth of one word per cycle, two words per cycle, between three and six words per cycle, or more than six words per cycle.

In some embodiments, memory node 500 may include a synchronization data buffer 504. Synchronization data buffer 504 may store synchronization data, including, without limitation, data identifying a sequential segment, data identifying a thread and/or core that executed a 'signal' instruction associated with a sequential segment, and/or any other data suitable for synchronizing the execution of parallel threads. The synchronization data stored in synchronization data buffer 504 may be received from any suitable source, including, without limitation, one or more processing cores, and/or one or more other memory nodes 500.

The following is a non-limiting description of the structure of synchronization data buffer 504. In some embodiments, synchronization data buffer 504 may be configured to store synchronization data from one synchronization instruction per processor core, from up to two synchronization instructions per processor core, and/or from more than two synchronization instructions per processor core. In some embodiments, synchronization data buffer may support a maximum read bandwidth sufficient to read synchronization data from more than 5 signal instructions per cycle, 5 signal instructions per cycle, between 1 and 5 signal instructions per cycle, or 1 signal instruction per cycle. In some embodiments, synchronization data buffer may support a maximum write bandwidth sufficient to write synchronization data from more than 5 signal instructions per cycle, 5 signal instructions per cycle, between 1 and 5 signal instructions per cycle, or 1 signal instruction per cycle. In some embodiments, synchronization data buffer 504 may store the synchronization data produced by a given signal instruction at least until the synchronization data is consumed by a corresponding 'wait' instruction.

In some embodiments, memory node 500 may include routing components suitable for routing shared data over the interconnects 330 of distributed memory unit 300. The routing components may include, without limitation, a node-to-node link buffer 530, node-to-node link 520 (including node-to-node link 520a for receiving shared data, node-to-node link 520b for sending flow-control data, node-to-node link 520c for sending shared data, and node-to-node link 520d for receiving flow-control data), core-node store link 516 (for receiving shared data produced by store instructions executed by one or more cores to which memory node 500 is coupled), selection circuit 540, and/or selection control circuit 550. In some embodiments, node-to-node link buffer 530 may buffer shared data received from one or more other memory nodes on node-to-node link 520a until the shared data is written to shared memory cache 502 or synchronization data buffer 504, and/or forwarded to one or more other memory nodes on node-to-node link 520c.

In some embodiments, selection control circuit 550 and selection circuit 540 may control the routing of shared data. In some embodiments, the routing of shared data may be controlled, at least in part, by flow control data. In some embodiments, when shared data is available on core-node store link 516 and in node-to-node link buffer 530, the shared data buffered in node-to-node link buffer 530 may be routed before the shared data on core-node store link 516. In some embodiments, prioritizing routing of shared data received from other memory nodes over shared data received from a coupled processing core may ensure that fresh shared data is not inadvertently overwritten by stale shared data.

In some embodiments, the routing components of memory node 500 may forward shared memory data to other memory nodes in lockstep with the synchronization data corresponding to the sequential segment in which the shared memory data was produced. In some embodiments, lockstep forwarding of a sequential segment's synchronization data and shared memory data may ensure that a subsequent thread does not enter the sequential segment and access the address of the shared memory data before the shared memory data is routed to the memory node coupled to the core on which the subsequent thread is executing.

In some embodiments, memory node 500 may include data processing hardware (e.g., an adder, a functional unit, etc.). The inclusion of data processing hardware in a memory node may permit embodiments of distributed memory unit 420 to execute instructions in the memory nodes, thereby reducing the number of clock cycles devoted to transferring data between a memory node and a corresponding core.

3.2. Memory Node Networks

In some embodiments, the interconnects 430 and memory nodes 421-428 of distributed memory unit 420 may be configured to form one or more networks among all the memory nodes and/or among subsets of the memory nodes. In some embodiments, the network(s) of memory nodes may be used to proactively forward shared data, and/or to broadcast shared data.

A network of memory nodes may have any suitable network topology including, but not limited to, a ring topology, a star topology, a mesh topology, and/or a hierarchical topology. In some embodiments, the interconnects and memory nodes may form a ring network (e.g., a unidirectional ring network) with low latency links between adjacent memory nodes in the ring.

In some embodiments, when memory node 500 receives shared data (e.g., from the node's predecessor node in the ring network, or from a core coupled to memory node 500), memory node 500 may store a local copy of the shared data (e.g., in shared memory cache 502 or in synchronization data buffer 504) and forward the shared data to the node's successor node in the ring network.

The following is a non-limiting description of the latency of communication in a network of memory nodes. In a network of memory nodes, a first node may be adjacent to one or more second nodes (e.g., the first node may be directly connected to each of the one or more second nodes through interconnect 430, and/or the first node may be able to communicate with the one or more second nodes without routing the communication through a third memory node). In some embodiments, the latency of communication between adjacent memory nodes may be between 1 and 32 periods ("cycles") of a processor clock (e.g., a clock operating at a frequency between hundreds of MHz and multiple GHz), between 1 and 20 clock cycles, between 1 and 15 clock cycles, between 1 and 10 clock cycles, between 1 and 8 clock cycles, between 1 and 6 clock cycles, between 1 and 4 clock cycles, 4 clock cycles, 3 clock cycles, 2 clock cycles, or 1 clock cycle. In some embodiments, the latency of communication between non-adjacent memory nodes may be at least K times the latency of communication between adjacent memory nodes, where K is the number of network hops (e.g., memory nodes) between the non-adjacent memory nodes. Such low-latency communication of shared data between memory nodes may, for example, facilitate automatic parallelization of small loops by reducing stalls associated with loading shared data from a memory node 500.

In some embodiments, distributed memory unit 420 may include two or more sub-networks including, but not limited to, sub-networks among a subset of the memory nodes of distributed memory unit 120, and/or sub-networks among other sub-networks. In some embodiments, distributed memory unit 420 may use a sub-network among a subset of memory nodes to share data among the cores coupled to the subset of memory nodes. In some embodiments, distributed memory unit 420 may use a sub-network among sub-networks to share data among the sub-networks.

In some embodiments, the topology of a network or sub-network of memory nodes may be statically fixed or dynamically variable. For example, distributed memory unit 420 may include a first sub-network of memory nodes 421, 422, 427, and 428, which may facilitate low-latency enforcement of dependences among threads executing on cores 411, 412, 417, and 418 (e.g., threads corresponding to four iterations of a loop). Continuing the example, distributed memory unit 420 may also include a second sub-network among memory nodes 423, 424, 425, and 426, which may facilitate low-latency enforcement of dependences among threads executing on cores 413, 414, 415, and 416 (e.g., threads corresponding to four iterations of another loop).

In some embodiments, distributed memory unit 420 may be configured to broadcast shared data from a memory node 500 coupled to a core on which the shared data was produced to one or more other memory nodes (e.g., to all memory nodes in distributed memory unit 420, to all memory nodes in the same network or sub-network as memory node 500, and/or to any other suitable set of memory nodes). In some embodiments, when distributed memory unit 420 broadcasts shared data within a network or sub-network, the shared data may be sent to the memory nodes of the network or sub-network in a specified order (e.g., ring order). In some embodiments, the specified order in which shared data is broadcast to the memory nodes of the network or sub-network may correspond to the dynamic execution order of the threads executing on the cores to which the memory nodes are coupled. For example, in a scenario where cores 411, 412, 417, and 417 are executing threads that correspond, respectively, to iterations N, N+1, N+2, and N+3 of a loop, and where distributed memory unit 420 includes a sub-network among memory nodes 421, 422, 427, and 428, shared data broadcast by memory node 421 may be sent first to node 422, then to node 427, then to node 428. In some embodiments, the broadcast network (or broadcast sub-network) may be a ring network in which shared data is transmitted in a single direction around the ring.

In some embodiments, in response to receiving shared data from a core or from another memory node, memory node 500 may proactively send the shared data to another memory node, and/or may broadcast the shared data to the other memory nodes (e.g., other memory nodes in the same network or sub-network as memory node 500).

3.3 Integration of Memory Nodes and Processing Cores

One or more processing cores of multicore processor 400 may be coupled to the memory nodes of distributed memory unit 420 and may communicate with distributed memory unit 420 through the memory nodes. This section of the disclosure describes the coupling and communication between the processor cores and the distributed memory unit, according to some embodiments.

The coupling between a core and a memory node may include, without limitation, a direct link (e.g., a link that connects a core and a memory node directly, without passing through other cores or memory nodes), an indirect link (e.g., a link that couples a core and a memory node indirectly, via at least one other core or memory node), a dedicated link (e.g., a link used only for communication between the core and the memory node), a shared link (e.g., a link used for communication between one or more cores and a memory node, between a core and one or more memory nodes, and/or between one or more cores and one or more memory nodes), and/or any other suitable link.

Any suitable correspondence between cores of multicore processor 400 and memory nodes of distributed memory unit 420 may be implemented, including, without limitation, a 1-to-1 correspondence (i.e., one or more cores coupled to one or more respective memory nodes), a many-to-1 correspondence (i.e., multiple cores coupled to a same memory node), 1-to-many correspondence (i.e., a same core coupled to multiple memory nodes), and/or a many-to-many correspondence (i.e., multiple cores coupled to multiple memory nodes). In some embodiments, a memory node may be integrated into a corresponding processing core, disposed off-core but adjacent to a corresponding processing core, disposed on-chip with a corresponding processor core, and/or disposed in any other suitable location. In the example of FIG. 4, distributed memory unit 420 includes eight memory nodes 421-428, each of which is coupled to a corresponding core of multicore processor 400 by a direct, dedicated link.

In some embodiments, a processor core may interact with a corresponding memory node when executing a synchronization instruction. When a thread executes a 'wait' instruction prior to entering a sequential segment, the thread's execution may be stalled until the memory node coupled to the core on which the thread is executing notifies the core that the thread can safely enter the sequential segment. In some embodiments, the memory node may notify the core that the thread can safely enter the sequential segment when the memory node has received a matching signal instruction from the thread's immediate logical predecessor, or when the memory node has received matching signal instructions from all logically earlier threads that are still executing. In some embodiments, the memory node's synchronization data buffer 504 may store the synchronization data needed to enforce the semantics of the 'wait' instruction.

When a thread executes a 'signal' instruction, the core on which the thread is executing may send the synchronization data associated with the signal instruction (e.g., data indicating that a signal instruction has been executed, data identifying the thread and/or core which executed the signal instruction, and/or data indicating which sequential segment is associated with the 'signal' instruction) to the core's corresponding memory node. In response to receiving the synchronization data, the memory node may store the synchronization data in synchronization data buffer 504 and route the synchronization data to memory nodes corresponding to cores on which logically later threads are executing. In some embodiments, shared memory data stored by one or more instructions in the sequential segment associated with the 'signal' instruction may be routed in lockstep with the synchronization data associated with the 'signal' instruction.

The wait and signal instructions may receive special treatment in out-of-order cores. Since 'signal' instructions may have system-wide side effects, such instructions may be constrained to issue non-speculatively from an out-of-order core's store queue, and the store queue may be configured to prevent load and store instructions from being reordered around the signal instructions (e.g., the store queue may prevent logically later load and store instructions from issuing before a logically earlier 'signal' instruction, and/or the store queue may prevent logically earlier load and store instructions from issuing after a logically later 'signal' instruction).

When a thread executes a memory access instruction (e.g., load or store) in a sequential code segment, the memory access instruction may access the memory node coupled to the core on which the thread is executing. In some embodiments, for memory access instructions in sequential code segments ("sequential memory access instructions"), the shared memory cache of the memory node coupled to a core may function as a part of the cache-memory hierarchy (e.g., as a level-0 data cache) for that core. Thus, sequential memory access instructions executed by a core may be sent to the shared memory cache of the core's memory node, such that sequential stores may write their data into the shared memory cache, sequential loads that hit in the shared memory cache may obtain their data from the shared memory cache, and sequential loads that miss in the shared memory cache may be sent to the next level of the cache-memory hierarchy (e.g., the level-1 cache or level-1 data cache).

An example has been described in which the shared memory cache of a memory node coupled to a processing core functions as a level-0 data cache for sequential memory access instructions executed by the core. In some embodiments, the shared memory cache may be configured to occupy any suitable level in the cache-memory hierarchy for sequential memory access instructions, including, without limitation, a lowest level of the cache-memory hierarchy (e.g., level 0), a level between the level-1 cache and the level-2 cache, a level between the level-2 cache and the level-3 cache, and/or a level between the level-3 cache and the main memory. Though, parallel threads with fine-grained data sharing may perform better when the shared memory caches are arranged at lower levels (e.g., at level 0) of the cache-memory hierarchy.

When a thread executes a memory access instruction (e.g., load or store) outside a sequential code segment, the memory access instruction may bypass the distributed memory unit and access the remainder of the cache-memory hierarchy in the conventional manner.

Processor cores may be configured to determine whether an instruction (e.g., a memory access instruction) is part of a sequential code segment. In some embodiments, a core may count the number of executed 'wait' instructions and the number of executed signal instructions (e.g., by incrementing a counter when a 'wait' instruction is executed, and by decrementing the counter when a signal instruction is executed). The core may determine that an issued instruction is part of a sequential code segment when the number of executed 'wait' instructions exceeds the number of executed signal instructions (e.g., when the value of the counter is non-zero), A memory node may communicate with other portions of the cache-memory hierarchy through one or more cache-memory links. In the example of FIG. 5, memory node 500 includes a bidirectional cache-memory link 518, through which memory node 500 may send data to the level-1 cache and/or retrieve data from the level-1 cache.

The cache-memory hierarchy of multicore processor 400 may be configured in any suitable way. In some embodiments, each processor core may be coupled to a private level-one cache. In some embodiments, two or more processor cores may share a level-two cache, and four or more processor cores (e.g., all processor cores) may share a level-three cache.

3.4. Integration of Distributed Memory Unit and the Cache-Memory Hierarchy

Multicore processor 400 may be configured such that the processor's memory consistency model and cache coherence protocol are unaffected by the integration of the distributed memory unit 420 into the cache-memory hierarchy. In some embodiments, sequential consistency may be preserved for instructions in sequential code segments. Distributed memory unit 420 may maintain sequential consistency for sequential memory access instructions at the level of the shared memory caches 302. To preserve sequential consistency of sequential memory access instructions in the other levels of the cache-memory hierarchy (which may provide a weaker consistency model), a single serialization point per memory location may be introduced into distributed memory unit 420. In some embodiments, each memory address may be "owned" by a single memory node of distributed memory unit 420, such that all interactions between distributed memory unit 420 and the cache-memory hierarchy referencing a given address are controlled by the memory node that owns the address. For example, when shared memory data is moved between distributed memory unit 420 and the cache-memory hierarchy (e.g., the level-1 cache) in response to a sequential load missing in a memory node's shared memory cache, or in response to an eviction from a memory node's shared memory cache, the memory node that owns the referenced memory address may control the required access to the cache-memory hierarchy.

Ownership of a memory address by a memory node may be implemented in any suitable way. In some embodiments, a memory node may read a missing memory location by injecting a request message onto link 519. The message may travel along link 519 to the memory node that owns the memory location. The owner memory node may fetch the value of the requested memory location from its shared memory cache or from its attached level-1 cache, and return the requested value to the requestor by injecting a reply message onto link 519. In some embodiments, when a memory node evicts a dirty memory address, the memory node may invalidate the evicted address in its shared memory cache and, if the memory node is the owner of the dirty memory address, the owner node may write the dirty value to the attached L1 cache. In some embodiments, all words of a cache line may be owned by the same memory node. In some embodiments, ownership of memory addresses may be distributed among the memory nodes using a suitable hash function, including, without limitation, a bit mask.

In some embodiments, the distributed memory unit 420 may be integrated into a conventional cache coherence protocol without requiring modifications to the cache coherence protocol. Consistency between the distributed memory unit 420 and the other portions of the cache-memory hierarchy may result from enforcement of three invariants. The first invariant, enforced by the compiler, may guarantee that shared memory addresses are accessed only within sequential code segments and only through the memory nodes of the distributed memory unit. The second invariant, enforced by the distributed memory unit, may guarantee that only the memory node that owns a particular shared memory address can read or write to that address through the L1 cache on a shared memory cache miss. The third invariant, enforced by the cache coherence protocol, may guarantee that the order of stores to a memory address through a given level-1 cache is maintained.

In some embodiments, each memory node may flush the dirty values of shared memory addresses to the level-1 cache when transitioning from a multi-threaded, parallel portion of a program to a single-threaded, serial portion of the program, and/or when a context switch is performed. In some embodiments, during a context switch, the memory nodes' synchronization data buffers may be backed up, flushed, and restored to the state corresponding to the incoming context.

3.5. Some Parallel Processing Techniques

Figure 6:
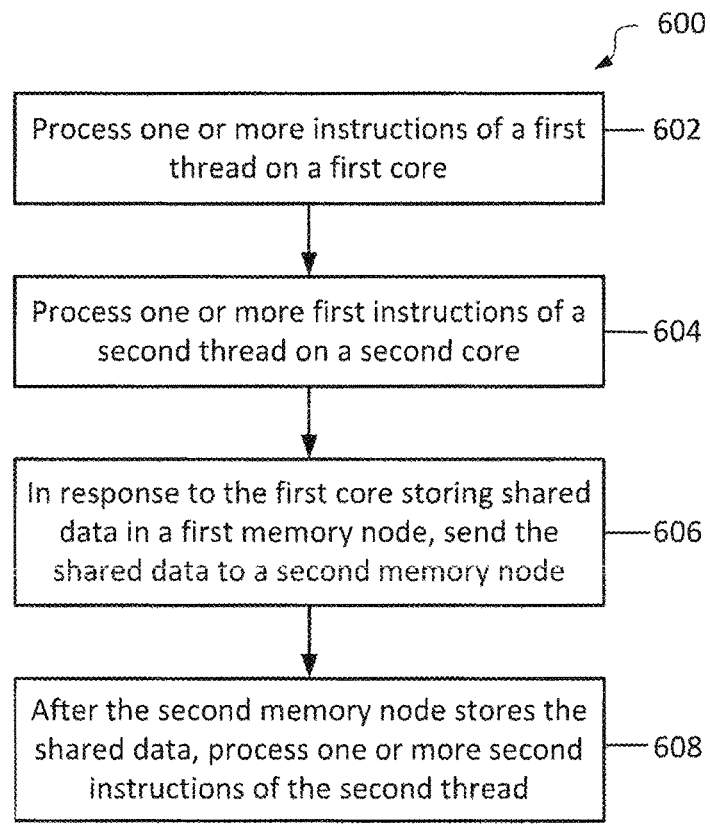
FIG. 6 shows a flowchart of a parallel processing method, according to some embodiments.

FIG. 6 illustrates a parallel processing method 600, according to some embodiments. In step 602, one or more instructions of a first thread are processed on a first processor core. The first processor core may be one of a plurality of cores of a multicore processor. The multicore processor may include a distributed memory node, which may include a plurality of memory nodes coupled, respectively, to the plurality of cores. Processing an instruction may include a processor core performing one or more operations on the instruction, including, without limitation, fetching, decoding, renaming, dispatching, scheduling, issuing, executing, completing, stalling, committing, and/or retiring the instruction.

In some embodiments, the one or more instructions of the first thread may include, without limitation, instructions of an iteration of a loop, instructions of a sequential code segment, instructions of a sequential code segment of a loop iteration, and/or any other suitable instructions.

In some embodiments, the one or more instructions of the first thread may include one or more producer instructions, including, without limitation, a store instruction, a signal instruction, and/or any suitable instruction that produces data (e.g., data produced by another thread). Processing a producer instruction may include storing, in a memory node coupled to the processor core, shared data produced by the producer instruction. The shared data may include, without limitation, shared memory data and/or synchronization data. In some embodiments, shared memory data may be stored in a shared memory cache of the memory node. In some embodiments, synchronization data may be stored in a synchronization data buffer of the memory node.

In step 604, one or more first instructions of a second thread are processed on a second processor core. The second processor core may be one of the plurality of cores of the multicore processor. In some embodiments, the one or more first instructions of the second thread may include, without limitation, instructions of an iteration of a loop, instructions of a sequential code segment, instructions of a sequential code segment of a loop iteration, and/or any other suitable instructions. In some embodiments, the one or more instructions of the first thread may include instructions of a first iteration of a loop, and the one or more first instructions of the second thread may include instructions of a second iteration of the same loop. The first and second loop iterations may be consecutive or non-consecutive. The second loop iteration may be logically later than the first loop iteration. In some embodiments, the one or more instructions of the first thread may include instructions of an iteration of a first loop, and the one or more first instructions of the second thread may include instructions of an iteration of a second, different loop. In some embodiments, the instructions of the first and second threads may be extracted from sequential code and converted into multithreaded, parallel code by a parallelizing compiler.

In some embodiments, the one or more first instructions of the second thread may be processed by the second core in parallel with the processing of the one or more instructions of the first thread by the first core. Parallel processing of instructions of a first thread on a first core and instructions of a second thread on a second core may include, without limitation, any scenario in which any portion of the processing of the first thread's one or more instructions is at least partially overlapped in time (e.g., performed simultaneously) with any portion of the processing of the second thread's first one or more instructions. In some embodiments, the instruction(s) of the first thread may produce shared data consumed by one or more second instructions of the second thread.

At step 606, in response to the first core storing shared data produced by the first thread in the first memory node of the distributed memory unit, the distributed memory unit may send the shared data to the distributed memory unit's second memory node, which may be coupled to the second processor core. In some embodiments, the shared data may include shared memory data of a store instruction and synchronization data of a subsequent synchronization instruction (e.g., a signal instruction), and the distributed memory unit may send the shared data to the second memory node in response to the first memory node obtaining the synchronization data of the subsequent synchronization instruction, such that the shared memory data produced by instructions within a sequential code segment are forwarded in lockstep with the synchronization data corresponding to the completion of that sequential code segment. In some embodiments, the shared data may include shared memory data of a store instruction, and the distributed memory unit may send the shared data to the second memory node in response to the first memory node obtaining the shared memory data of the store instruction, such that the shared memory data produced by instructions within a sequential code segment are forwarded prior to forwarding the synchronization data corresponding to the completion of that sequential code segment. In some embodiments, the shared data may include synchronization data of a synchronization instruction (e.g., a signal instruction), and the distributed memory unit may send the shared data to the second memory node in response to the first memory node obtaining the synchronization data.

In some embodiments, the distributed memory unit may route the shared data to the second memory node over a network (e.g., a ring network). In some embodiments, the distributed memory unit may send shared data from a first memory node to a second memory node by broadcasting the shared data to one or more (e.g., all) of the memory nodes. In some embodiments, the distributed memory unit may broadcast the shared data to the memory nodes by routing the shared data over a network (e.g., a ring network). In some embodiments, the routing of shared data over the network may be performed in a parallel with the processor cores continuing to process instructions, and/or without intervention by the processor cores. In some embodiments, the one-hop communication latency of the network (e.g., the latency of communication between adjacent memory nodes in a ring network) may be between 1 and 30 clock cycles of the multicore processor, between 1 and 20 clock cycles, between 1 and 10 clock cycles, between 1 and 8 clock cycles, between 1 and 6 clock cycles, between 1 and 4 clock cycles, between 1 and 2 clock cycles, or 1 clock cycle.

At step 608, after the second memory node stores the shared data forwarded by the first memory node, one or more second instructions of the second thread may be processed by the second processor core. In some embodiments, the one or more second instructions of the second thread may include, without limitation, instructions of an iteration of a loop, instructions of a sequential code segment, instructions of a sequential code segment of a loop iteration, and/or any other suitable instructions. In some embodiments, the one or more instructions of the first thread may include instructions of a first iteration of a loop, and the one or more second instructions of the second thread may include instructions of a second iteration of the same loop. The first and second loop iterations may be consecutive or non-consecutive. The second loop iteration may be logically later than the first loop iteration. In some embodiments, the one or more instructions of the first thread may include instructions of an iteration of a first loop, and the one or more second instructions of the second thread may include instructions of an iteration of a second, different loop.

In some embodiments, the one or more second instructions of the second thread may include one or more consumer instructions, including, without limitation, a load instruction, a 'wait' instruction, and/or any suitable instruction that consumes data (e.g., data produced by another thread). Processing a consumer instruction may include loading, from a memory node coupled to a processor core, shared data produced by another thread. The shared data may include, without limitation, shared memory data and/or synchronization data.

In some embodiments, the shared memory cache of each memory node in the distributed memory unit may have a capacity of 256 bytes, 1 KB, or 2 KB, may have a bandwidth of one word per cycle, and may be 8-way set associative. In some embodiments, each memory node may correspond to a respective core, and the latency of communication between a core and its corresponding memory node may be 2 clock cycles. In some embodiments, the synchronization data buffer of each memory node in the distributed memory unit may have bandwidth sufficient to handle synchronization data from five signal instructions per cycle.

In some embodiments, synchronization data from at most two 'signal' instructions per sequential segment emitted by a given core may be in flight at any time. In such embodiments, the distributed memory unit 420 may track synchronization data from only two 'signal' instructions per sequential segment, or synchronization data from only two 'signal' instructions per sequential segment per core. This property may facilitate elimination of unnecessary 'wait' instructions while keeping the architectural enhancement simple Eliminating unnecessary 'wait' instructions may allow a core to execute a later loop iteration than the loop iteration executing on the core's successor, which may significantly boost parallelism. Future iterations, however, may also produce synchronization data. Constraining the distributed memory to track synchronization data from only two 'signal' instructions per sequential segment may prevent a core from getting more than one "lap" ahead of its successor. When buffering synchronization data, each memory node may be configured to distinguish two types of synchronization data—data from past iterations and data from future iterations.

4. Parallelizing Compiler

According to an aspect of the present disclosure, a parallelizing compiler is provided. In some embodiments, the compiler may automatically convert suitable sequential software into multithreaded, parallel software. In some embodiments, converting sequential software into parallel software may include one or more analysis steps, code transformation steps, and/or selection steps. In the analysis step(s), the compiler may analyze the software to identify dependences (e.g., data-flow dependences and/or control-flow dependences), to identify portions of the software that exhibit thread-level parallelism, and/or to identify certain types of software constructs (e.g., loops). In the code transformation step(s), the compiler may transform the code to decrease dependences, to increase parallelism, and/or to replace sequential code with explicitly parallel code. In the selection step(s), the compiler may evaluate the potential benefits of parallelizing various portions of the software, and select one or more portions of the software for parallelization based on the evaluation.

In some embodiments, the compiler may select one or more loops to parallelize. The compiler may parallelize a loop by replacing the sequential loop code with threads suitable for executing the iterations of the loop in parallel. In some embodiments, the compiler may be constrained to generate parallel code such that at most one loop is executed in parallel at any time.

4.1. Compiler Analyses

In some embodiments, the compiler may analyze software (e.g., source code) to identify dependences. The compiler analyses may identify any suitable dependences, including, without limitation, data dependences, control dependences, loop-carried dependences, true dependences, and/or false dependences. The compiler analyses may be conservative, in the sense that the compiler may assume that there is a dependence between two instructions unless the compiler can prove that the instructions are independent.

In some embodiments, the compiler may perform any suitable analysis, including, without limitation, flow-sensitive analysis to track values of registers and memory locations according to their position in the code, and/or path-based analysis to name runtime locations by how they are accessed from program variables. In some embodiments, the compiler may use data type and type casting information to conservatively eliminate incompatible aliases, thereby reducing misidentification of false dependences as true dependences.

In some embodiments, the compiler may analyze software to identify specified types of software constructs, including, without limitation, loops.

4.2. Compiler Transformations

In some embodiments, the compiler may replace sequential code with explicitly parallel code (e.g., by distributing loop iterations among parallel threads). In so doing, the compiler may use code transformations which guarantee correct execution of the parallel threads, by ensuring that the parallel threads do not violate any of the sequential code's true data dependences. As part of the process of generating correct parallel code, the compiler may identify data shared by two or more threads, and place the instructions which access shared data in sequential code segments. The compiler may place synchronization instructions at the beginning and end of each sequential segment. Specifically, the compiler may place a 'wait' instruction at the beginning of each sequential segment, and a 'signal' instruction at the end of each sequential segment. Each synchronization instruction may have a parameter (e.g., an integer value) that identifies the corresponding sequential segment. As discussed above, the synchronization instructions ensure that all instances of a given sequential code segment execute in sequential order (e.g., in loop iteration order), under a sequential consistency model. In this way, the compiler may guarantee that all accesses to shared memory addresses are always executed in a proper order.

As part of the process of generating correct parallel code, the compiler may perform value forwarding on register-allocated shared data. In the sequential code, some shared data may be allocated to registers of a processor core. To ensure proper sharing of such data, the compiler may transform the register-allocated shared data into memory-allocated shared data and place the instructions which access the shared data within a sequential code segment, thereby ensuring that the shared data is managed by the distributed memory unit, and ensuring that instructions which access the shared data are constrained to execute in a proper order.

In some embodiments, the compiler may transform code (e.g., sequential code and/or parallel code) to increase parallelism. Suitable code transformations may include, without limitation, code scheduling, method inlining, loop unrolling, parallel reduction, replacement of data sharing with local re-computation, scalar expansion, scalar renaming, loop splitting, and/or any suitable parallelism-enhancing transformation. The code scheduling, method inlining, and/or loop splitting may, in some embodiments, enhance parallelism by reducing the number of instructions in sequential code segments. The parallel reduction and/or replacement of data sharing with local re-computation may, in some embodiments, reduce loop-carried dependences. The loop splitting and/or replacement of data sharing with local re-computation may, in some embodiments, enhance parallelism by reducing the amount of thread synchronization or the overhead of a synchronization operation.

Replacement of data-sharing with local re-computation may be beneficial when the value of a loop-carried dependence is predictable. As described above, the latency of sharing data between threads may be reduced by using a distributed memory unit to proactively send shared data from a producer thread to a consumer thread. However, when the value of the shared data is predictable, the consumer thread may re-compute the value of the shared data, rather than receiving the value of the shared data, and the communication of the shared data can be eliminated altogether. In some embodiments, data-sharing communication may be replaced with local re-computation of predictable values, including, without limitation, (1) induction variables where the update function is a polynomial up to the second order; (2) accumulative, maximum, and minimum variables; (3) variables set but not used until after the loop; and (4) variables set in every iteration even when the updated value is not constant.

In some embodiments, the overhead of synchronization may be reduced by splitting sequential code segments. In some embodiments, all accesses to a given shared memory address may be performed by instances of the same sequential segment, and no shared memory address may be accessed by instances of different sequential segments. Thus, instances of different sequential segments may safely execute in parallel, without synchronization. Accordingly, splitting sequential segments may increase parallelism by reducing the length of individual sequential segments and by exposing thread-level parallelism among instances of different sequential segments. On the other hand, splitting sequential segments may increase the number of synchronization instructions executed and the amount of synchronization data being managed by the distributed memory unit.

4.3. Compiler Selection of Portions of a Program to Parallelize

In some embodiments, the compiler may determine which portions (e.g., which loops) of a program execute in parallel and which portions of the program execute sequentially. The determination of which portion of a program executes in parallel may be based, at least in part, on information characterizing parallel execution of the program, which may be obtained using profile-driven analysis, simulation, one or more heuristics, one or more analytical models, and/or any other technique suitable for predicting the performance of parallelized code.

In some embodiments, information characterizing parallel execution of a program may be obtained by parallelizing at least a portion of the program and profiling the parallelized portion of the program. In some embodiments, one or more loops (e.g., all loops) of a program may be parallelized and profiled. In some embodiments, parallelized portions of a program may be profiled independently, such that a selected portion of the program (e.g., a loop) is parallelized and profiled, while the other portions of the program are not parallelized. Parallelizing and profiling portions of a program independently may facilitate analysis of the profiling results by isolating the effects of parallelizing each portion of the program from the effects of parallelizing other portions of the program.

In some embodiments, profiling a parallelized portion of a program may comprise executing the parallelized portion on one or more cores of a multicore processor. In some embodiments, profiling a parallelized portion of a program may comprise executing the program on one or more cores of a multicore processor, including the parallelized portion of the program. For example, information characterizing parallel execution of a program on a multicore processor equipped with a distributed memory unit may be obtained by profiling at least a parallelized portion of the program (e.g., one or more parallelized loops) on such a multicore processor. In some cases, profiling a portion of program on a target processor may be infeasible. For example, the target processor may not have been fabricated, or may be otherwise unavailable to the user.

In some embodiments, profiling a parallelized portion of a program may comprise acquiring a trace of the parallelized portion of the program and simulating execution of the traced instructions on a simulator of the target processor. In some embodiments, acquiring the trace of the parallelized portion of the program may comprise serializing the parallelized portion's parallel threads (i.e., constraining the parallel threads to execute in series). In some embodiments, acquiring the trace of the parallelized portion may further comprise recording the sequence in which the program's instruction are executed when the parallel threads are constrained to execute in series, and/or instrumenting the parallelized portion to gather additional information. For example, a trace of a parallelized loop may be obtained by forcing the parallelized loop's iterations to execute in loop-iteration order (e.g., on a same processor core). The sequence in which the which the parallelized loop's instructions are executed may be recorded, and/or the parallelized loop may be instrumented (e.g., by injecting instrumentation code at the top of the loop, at the end of loop, at the top of loop iterations, at the end of loop iterations, at the beginning of sequential segments, and/or at the end of sequential segments) to record additional information.

In some embodiments, simulating execution of the traced instructions may comprise simulating execution of the traced instructions on a trace-driven or event-driven simulator of the target processor. For example, execution of the traced instructions may be simulated on a trace-driven or event-driven simulator of a multicore processor 400 equipped with a distributed memory unit 420.

In some embodiments, information characterizing parallel execution of a program may be obtained by parallelizing at least a portion of the program and simulating execution of the parallelized portion on an execution-driven simulator of the target processor. In some embodiments, the execution-driven simulator of the target processor may be more accurate but also slower than the trace-driven or event-driven simulator. In some embodiments, compiler may determine which type of simulator is used to simulate execution of a parallelized portion of the program. The compiler's determination may be based on any suitable criteria, including, without limitation, the number of sequential segments in the parallelized portion, the length of the sequential segments in the parallelized portion, the proportion of the parallelized portion's instructions contained in sequential segments, the locality of accesses to shared data, and/or any other suitable criteria. In some embodiments, the compiler may select the execution-driven simulator when the number of sequential segments exceeds a threshold, when the length of the sequential segments exceeds a threshold, when the proportion of the instructions contained in sequential segments exceeds a threshold, and/or when the locality of accesses to shared data is less than a threshold locality.

In some embodiments, the results of the profiling and/or simulation may be used to generate information characterizing the parallel execution of portions of the program. In some embodiments, the execution time (e.g., wall-clock time or number of processor clock cycles) of a parallelized portion of the program may be compared to the execution time of the corresponding sequential version of the same portion of the program to determine the speedup obtained by parallelizing that portion of the program. In some embodiments, the power consumption and/or energy dissipation of the target processor during execution of the parallelized portion may be compared to the power consumption and/or energy dissipation of the target processor (or any suitable processor) during execution of the sequential version of the same portion to determine the increase (or decrease) in power consumption and/or energy dissipation associated with switching from the sequential version to the parallelized version of that portion of the program. Any suitable indicator of performance may be derived in like manner.

In some embodiments, information characterizing parallel execution of a program may be obtained by applying heuristics and/or analytical models to at least portions of the program (e.g., portions of the parallelized program and/or portions of the sequential version of the program). In some embodiments, an analytical model and/or heuristic may comprise a mathematical expression which depends on one or more parameters which are in some way descriptive of a program and/or of a processor on which a user may wish to execute the program. The descriptive parameters may include, without limitation, the number of sequential segments in a parallelized portion of the program, the length of the sequential segments in the parallelized portion, the proportion of the of the parallelized portion's instructions contained in sequential segments, the locality of accesses to shared data by instructions in the parallelized portion, the latency of communication between cores (or memory nodes) of the target processor, the number of loop iterations in the parallelized portion, the number of cores on the target processor, the number of instructions in the loop iterations in the parallelized portion, and/or any other suitable parameter. In some embodiments, applying an analytical model and/or heuristic may comprise evaluating the expression corresponding to the analytical model and/or heuristic. In this way, the analytical model and/or heuristic may generate a value which is indicative of the amount of parallelism, the synchronization overhead, and/or the communication overhead associated with parallelizing a portion of a program.

In some embodiments, the compiler may determine which portions (e.g., loops) of the program to parallelize based, at least in part, on the information characterizing the parallel execution of the program (e.g., the information obtained from profiling, simulation, application of analytical models, and/or application of heuristics). In some embodiments, the information characterizing the parallel execution of the program may include values characterizing the parallel execution of portions of the program. In some embodiments, these values may be compared to thresholds to determine which portions of the program to parallelize. In some embodiments, these values may be assigned to nodes of a loop nesting graph, and the loop nesting graph may be analyzed to determine which portions of the program to parallelize. Some embodiments of techniques for selecting portions of a program to parallelize based on a loop nesting graph are described in S. Campanoni et al., HELIX: Automatic Parallelization of Irregular Programs for Chip Multiprocessing, Proceedings of the International Symposium on Code Generation and Optimization (CGO), 2012.

4.4. Parallelizing Compiler Techniques

Figure 7:
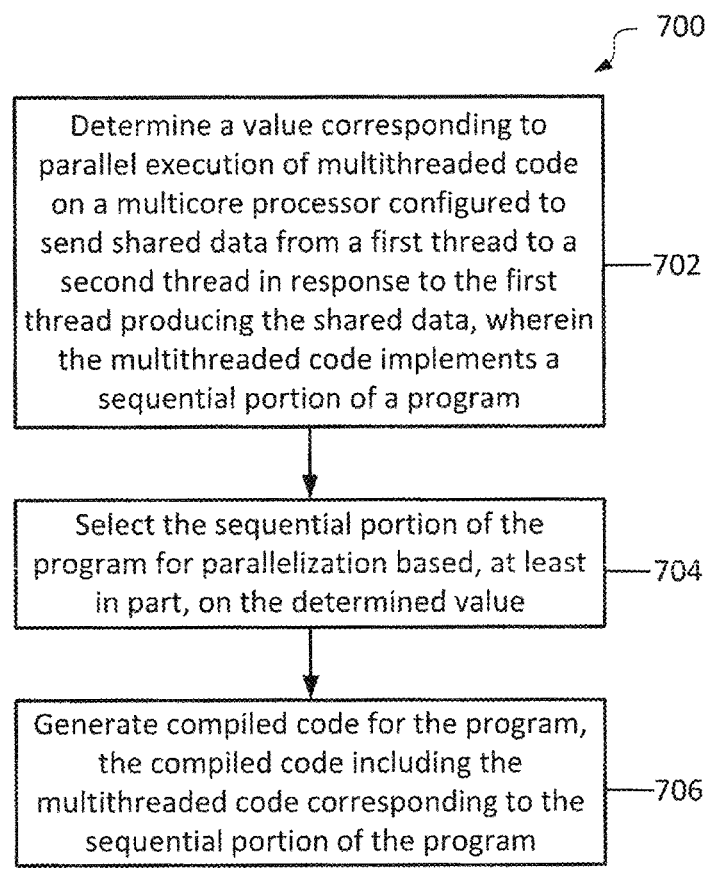
FIG. 7 shows a flowchart of a method of parallelizing sequential code, according to some embodiments.

FIG. 7 illustrates a method 700 of parallelizing sequential code, according to some embodiments. In act 702, a value corresponding to parallel execution of multithreaded code on a multicore processor may be determined. The multicore processor may be configured to send shared data from a first thread to a second thread in response to the first thread producing the shared data (e.g., using a distributed memory unit 420). The multithreaded code may implement a sequential portion of a program. In some embodiments, the value corresponding to parallel execution of multithreaded code may be equal to or otherwise indicative of the difference between the execution time, power consumption, and/or energy dissipation of the multithreaded code on the multicore processor and the execution time, power consumption, and/or energy dissipation of the sequential code corresponding to the multithreaded code.

In some embodiments, the value corresponding to the parallel execution of multithreaded code may be determined by executing the multithreaded code on the multicore processor and/or by simulating execution of the multithreaded code on the multicore processor (e.g., using a trace-driven simulator, an event-driven simulator, and/or an execution-driven simulator). In some embodiments, the simulator may simulate evictions of shared data from a distributed memory unit prior to consumption of the shared data by a thread. In some embodiments, the simulator may simulate a distributed memory unit with unlimited storage capacity.

In some embodiments, the value corresponding to the parallel execution of multithreaded code on the multicore processor may be estimated based on one or more attributes of the multicore processor and/or the code, including, without limitation, the latency of communication between memory nodes of the distributed memory unit, the capacity and/or bandwidth of the storage structures in the memory nodes of the distributed memory unit, the number of sequential segments in the multithreaded code, the length of the sequential segments in the multithreaded code, the proportion of the multithreaded code's instructions contained in sequential segments, the locality of accesses to shared data by instructions in the multithreaded code, the number of loop iterations corresponding to the multithreaded code, the number of processor cores on the multicore processor, the number of instructions in the loop iterations corresponding to the multithreaded code, and/or any other suitable parameter.

In some embodiments, the sequential portion of the program may comprise a loop, and the threads of the multithreaded code may correspond to iterations of the loop.

In some embodiments, one or more code transformations may be performed on the multithreaded code, including, without limitation code scheduling, method inlining, loop unrolling, parallel reduction, scalar expansion, scalar renaming, loop slitting, sequential segment splitting, and/or any other suitable transformations. In some embodiments, performing the one or more code transformations on the multithreaded code may improve the multithreaded code's performance, increase the parallelism among the threads of the multithreaded code, reduce the amount of synchronization performed by the threads of the multithreaded code, and/or reduce the amount of communication among the threads of the multithreaded code.

In act 704, the sequential portion of the program may be selected for parallelization based, at least in part, on the value corresponding to the parallel execution of multithreaded code. In some embodiments, the value may be compared to a threshold to determine whether the sequential portion of the program is selected for parallelization.

In some embodiments, the sequential portion of the program may be a loop, and the value may be assigned to a node of a loop nesting graph. In some embodiments, values corresponding to parallel execution of other loops on the multicore processor may be assigned to corresponding nodes in the loop nesting graph. In some embodiments, the loop nesting graph may be analyzed to select one or more sequential portions of the program (e.g., sequential loops) for parallelization.

In act 706, compiled code may be generated for the program. The compiled code may include the multithreaded code corresponding to the portion(s) of the program selected for parallelization in act 704.

Figure 8:
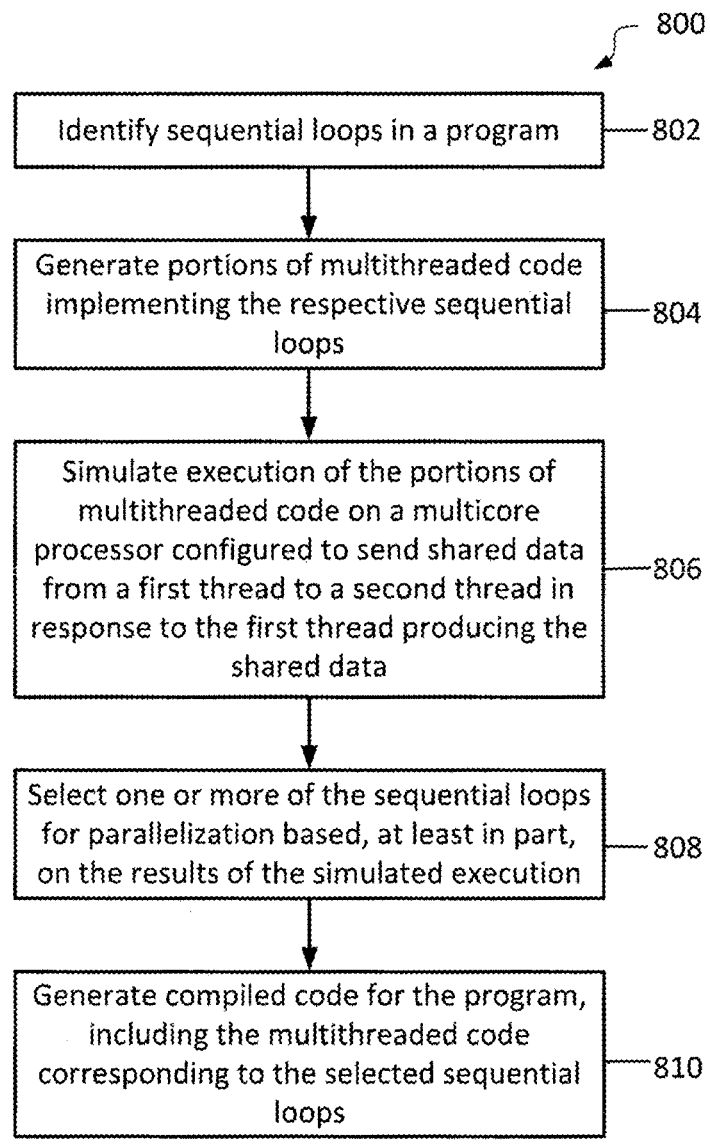
FIG. 8 shows a flowchart of a method of parallelizing sequential code, according to some embodiments.

FIG. 8 illustrates a method 800 of parallelizing sequential code, according to some embodiments. At act 802, one or more (e.g., all) loops in a program are identified. The program's loops may be identified using any suitable technique, including, without limitation, control flow analysis.

At act 804, portions of multithreaded code implementing the respective sequential loops are generated. The portions of multithreaded code may be generated using any suitable technique, including, without limitation, dependence analysis (e.g., to identify loop-carried dependences, to identify shared memory addresses, to identify instructions accessing shared memory addresses, to distinguish true dependences from false dependences, or for any other suitable purpose), code transformation (e.g., reduce inter-thread dependences and/or increase thread-level parallelism), and/or any other suitable technique.

At act 806, execution of the portions of multithreaded code on a multicore processor is simulated. The simulated multicore processor may be configured to send shared data from a first thread to a second thread in response to the first thread producing the shared data (e.g., using a distributed memory unit). One or more results may be obtained from the simulated execution of the portions of multithreaded code. The results may include, without limitation, the execution time, power consumption, and/or energy dissipation of the simulated execution.

At act 808, one or more of the loops is/are selected for parallelization based, at least in part, on the results obtained from the simulated execution. The selected loop(s) may be selected in any suitable way, including, without limitation, analyzing a loop nesting graph annotated with the results of the simulated execution.

At act 810, compiled code may be generated for the program. The compiled code may include the multithreaded code corresponding to loops selected for parallelization in act 808.

In some embodiments, when a parallelizing compiler compiles a sequential program for execution as parallel threads on a multicore processor 400, the portions of the sequential program selected by the compiler for extraction as parallel threads may depend on the communication latency between the processor's cores, which may depend on the communication latency between memory nodes of the processor's distributed memory unit 420. In some embodiments, a parallelizing compiler's method of parallelizing sequential code may include steps of: determining parallelism and communication among iterations of a loop; determining whether to parallelize the loop based, at least in part, on an estimated latency of communication between cores of a multicore processor, the cores of the multicore processor being coupled to memory nodes of a distributed memory unit; and when it is determined to parallelize the loop, extracting two or more threads corresponding to iterations of the loop.

Figure 9:
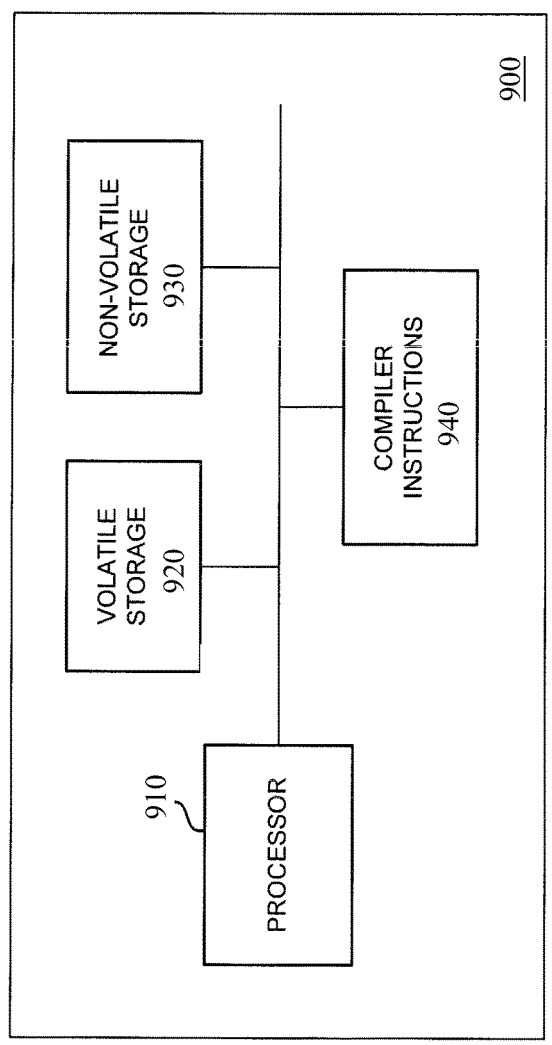
FIG. 9 shows a block diagram of a computer system on which aspects of a parallelizing compiler may be implemented, according to some embodiments.

A system implementing a parallelizing compiler in accordance with the techniques described herein may take any suitable form, as some embodiments are not limited in this respect. An illustrative implementation of a computer system 900 that may be used in connection with some embodiments of a parallelizing compiler is shown in FIG. 9. One or more computer systems such as computer system 900 may be used to implement any of the compiler functionality described above. The computer system 900 may include one or more processors 910 and one or more computer-readable storage media (i.e., tangible, non-transitory computer-readable media). The computer readable storage media may include, for example, volatile storage 920 and/or non-volatile storage 930. Non-volatile storage 930 may be formed of any suitable non-volatile data storage medium. The processor 910 may control writing data to and reading data from the volatile storage 920 and/or the non-volatile storage 930 in any suitable manner, as some embodiments are not limited in this respect. To implement any portion of the parallelizing compiler described herein, processor 910 may execute one or more compiler instructions 940 stored in one or more computer-readable storage media (e.g., volatile storage 920, non-volatile storage 930, and/or any other suitable computer-readable storage medium), which may serve as tangible, non-transitory computer-readable media storing instructions for execution by processor 910. In some embodiments, one or more processors 910 may include one or more processing circuits, including, but not limited to, a central processing unit (CPU), a graphics processing unit (GPU), a field-programmable gate array (FPGA), an accelerator, and/or any other suitable device (e.g., circuit) configured to process data.

It should be appreciated from the foregoing that some embodiments are directed to parallel compilation methods 700 and 800. Method 700 and/or method 800 may be performed, for example, by one or more components of computer system 900, although other implementations are possible, as methods 700 and 800 are not limited in this respect.

The above-described embodiments of the parallelizing compiler may be implemented in any of numerous ways. For example, some embodiments may be implemented using hardware, software, or a combination thereof. When implemented in software, the software code may be executed on any suitable processor (e.g., processing circuit) or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) programmed using microcode or software to perform the functions recited above.

In this respect, it should be appreciated that one implementation of some embodiments of the parallelizing compiler comprises at least one computer-readable storage medium (i.e., at least one tangible, non-transitory computer-readable medium, e.g., a computer memory, a floppy disk, a compact disc, a DVD, an optical disc, a magnetic tape, or other tangible, non-transitory computer-readable medium) encoded with a computer program (e.g., a plurality of instructions), which, when executed on one or more processors, performs above-discussed functions of embodiments of the parallelizing compiler. The computer-readable storage medium may be transportable such that the program stored thereon can be loaded onto any suitable computer resource to implement aspects of the parallelizing compiler discussed herein. In addition, it should be appreciated that the reference to a computer program which, when executed, performs above-discussed functions, is not limited to an application program running on a host computer. Rather, such a computer program may include any type of computer code (e.g., software or microcode) that may be employed to program one or more processors to implement above-discussed aspects of the parallelizing compiler.

5. Some Parallel Processing Techniques

Some embodiments described herein have specific applicability to parallelization of loops. However, some embodiments are not limited to parallelization of loops. Aspects of the present disclosure may be applied to parallelization of any sequential code.

In some embodiments, multicore processor 400 may be configured to simultaneously execute parallel threads implementing iterations of at most one loop. In some embodiments, multicore processor 400 may be configured to simultaneously execute parallel threads implementing iterations of more than one loop.

In some embodiments, the number of cores available for execution of parallel threads (e.g., parallel threads corresponding to iterations of a loop) may be set in any suitable way including, but not limited to, setting the number of cores available at compile-time, setting the number of cores available at run-time, and/or varying the number of cores available during execution (e.g., during execution of a program or during execution of the loop).

In some embodiments, a run-time framework may adapt multicore processor 400 to execute a parallel program on a varying number of processing cores. In multi-programmed environments, the number of cores available to a given program may vary, depending on the requirements of other programs. Also, different portions of a parallel program may be able to make efficient use of different numbers of processing cores. For at least these reasons, the run-time framework may adapt a parallel program to execute on one processing core, two processing cores, all processing cores, or any suitable number of a multicore processor's cores.

Some embodiments of distributed memory unit 420 may be configured to facilitate parallel execution of speculative threads. Speculative threads may include threads that speculate on data dependences. A speculative thread may speculate on a data dependence in any suitable way including, but not limited to, speculating that there is no data dependence between the speculative thread and a second thread, speculating that there is no data dependence between a portion of the speculative thread and a second thread, speculating that there is no data dependence between the speculative thread and a portion of a second thread, or speculating that there is no data dependence between a portion of the speculative thread and a portion of a second thread. Some embodiments of distributed memory unit 420 may facilitate enforcement of dependences among speculative threads by detecting whether a speculative thread has violated a true data dependence and, when a speculative thread has violated a true data dependence, by preventing the speculative thread from committing instructions that depend on the violated data dependence.

In some embodiments, a speculative thread may speculate on a data dependence by predicting a value of data to be consumed by an instruction of the speculative thread. Some embodiments of distributed memory unit 420 may facilitate enforcement of dependences for a speculative thread that performs value prediction by detecting whether the speculative thread has predicted a consumed value incorrectly and, when the speculative thread has predicted the consumed value incorrectly, by preventing the speculative thread from committing instructions that depend on the incorrectly predicted value.

Various aspects and embodiments are described below:

(1) A multicore processor, comprising: a set of cores including first and second cores; and a distributed memory unit, including a set of memory nodes, the set of memory nodes including a first memory node coupled to the first core and a second memory node coupled to the second core, wherein the first core is configured to process one or more instructions of a first thread, the one or more instructions of the first thread including one or more producer instructions, and wherein processing the one or more producer instructions includes storing, in the first memory node, data shared by the first thread and a second thread, wherein the second core is configured to process one or more first instructions of the second thread in parallel with the first core processing the one or more instructions of the first thread, wherein the distributed memory unit is configured to send the shared data to the second memory node in response to the first core storing the shared data in the first memory node, and wherein the second core is configured to process one or more second instructions of the second thread after the second memory node stores the shared data sent by the distributed memory unit, wherein the one or more second instructions of the second thread include a consumer instruction, and wherein processing the consumer instruction includes loading the shared data from the second memory node.

(2) The multicore processor of (1), wherein the distributed memory unit is configured to broadcast the shared data in response to the first core storing the shared data in the first memory node, wherein broadcasting the shared data comprises sending the shared data to at least the second memory node.

(3) The multicore processor of (2), wherein the set of cores further includes a third core, wherein the set of memory nodes further includes a third memory node coupled to the third core, and wherein broadcasting the shared data further includes sending the shared data to the third memory node.

(4) The multicore processor of (2), wherein the distributed memory unit further includes interconnects, wherein the interconnects and the set of memory nodes are coupled together to form a network, and wherein the network is configured to perform the broadcasting of the shared data by routing the shared data from the first memory node to other nodes of the network.

(5) The multicore processor of (4), wherein the network comprises a ring network, wherein the ring network couples the memory nodes in a ring, and wherein the ring network is configured to route the shared data around the ring in a single direction.

(6) The multicore processor of (5), wherein the ring network is configured to route the shared data around the ring in parallel with the first core processing the one or more instructions of the first thread and/or in parallel with the second core processing the one or more first instructions of the second thread.

(7) The multicore processor of (4), wherein the network is configured to perform the routing of the shared data in parallel with the first core processing the one or more instructions of the first thread and/or in parallel with the second core processing the one or more first instructions of the second thread.

(8) The multicore processor of (4), wherein the set of cores is a first set of cores, wherein the set of memory nodes is a first set of memory nodes, wherein the interconnects are first interconnects, wherein the network is a first network, wherein the one or more instructions of the first thread include one or more instructions of an iteration of a first loop, and wherein: the multicore processor further comprises a second set of cores, the distributed memory unit further comprises a second set of memory nodes and second interconnects coupled together to form a second network, cores of the second set of cores are coupled to respective memory nodes of the second set of memory nodes, and the cores of the second set of cores are configured to process one or more instructions of iterations of a second loop while the first core processes the one or more instructions of the iteration of the first loop.

(9) The multicore processor of (8), wherein the distributed memory unit further comprises third interconnects configured to couple the first and second networks.

(10) The multicore processor of (4), wherein the set of cores further includes a third core, wherein the set of memory nodes further includes a third memory node coupled to the third core, and wherein the distributed memory unit is further configured to remove the second memory node from the network, and/or to add the third memory node to the network.

(11) The multicore processor of (2), wherein the distributed memory unit is configured to broadcast the shared data in parallel with the first core processing the one or more instructions of the first thread and/or in parallel with the second core processing the one or more first instructions of the second thread.

(12) The multicore processor of (1), wherein the one or more producer instructions include a store instruction, wherein storing the shared data of the one or more producer instructions in the first memory node comprises storing data of the store instruction in the first memory node, and wherein the distributed memory unit is configured to send the data of the store instruction to the second memory node in response to the first core storing the data of the store instruction in the first memory node.

(13) The multicore processor of (1), wherein the one or more producer instructions include a synchronization instruction, wherein storing the shared data of the one or more producer instructions in the first memory node comprises storing data of the synchronization instruction in the first memory node, and wherein the distributed memory unit is configured to send the data of the synchronization instruction to the second memory node in response to the first core storing the data of the synchronization instruction in the first memory node.

(14) The multicore processor of (1), wherein the one or more producer instructions include a store instruction and a subsequent synchronization instruction, wherein storing the shared data of the one or more producer instructions in the first memory node comprises storing data of the store instruction and data of the subsequent synchronization instruction in the first memory node, and wherein the distributed memory unit is configured to send the data of the store instruction and the data of the subsequent synchronization instruction to the second memory node in response to the first core storing the data of the subsequent synchronization instruction in the first memory node.

(15) The multicore processor of (1), wherein the multicore processor further includes a cache-memory hierarchy, and wherein the distributed memory unit is coupled to the cache-memory hierarchy.

(16) The multicore processor of (15), wherein the first core is configured to access the first memory node as a lowest level of the cache-memory hierarchy during processing of a first of the one or more instructions of the first thread.

(17) The multicore processor of (16), wherein the first core is configured to access a level-one cache as a lowest level of the cache-memory hierarchy during processing of a second of the one or more instructions of the first thread.

(18) The multicore processor of (1), wherein sending the shared data to the second memory node comprises sending the shared data to the second memory node prior to the second core executing the one or more second instructions of the second thread.

(19) The multicore processor of (1), wherein processing the one or more instructions of the first thread includes processing instructions of a first iteration of a loop, and wherein processing the one or more first and/or second instructions of the second thread includes processing instructions of a second iteration of the loop.

(20) The multicore processor of (1), wherein the wherein the instructions of the loop are automatically extracted from sequential code and converted into parallel code by a compiler.

(21) The multicore processor of (1), wherein the multicore processor further includes a clock component configured to produce a clock signal to synchronize processing of components of the first core, and wherein the distributed memory unit is configured to send the shared data from the first memory node to the second memory node in a time period that spans between 1 and 10 periods of the clock signal, between 1 and 8 periods of the clock signal, between 1 and 6 periods of the clock signal, between 1 and 4 periods of the clock signal, between 1 and 2 periods of the clock signal, or 1 period of the clock signal.

(22) A method of processing instructions in parallel on a multicore processor, the multicore processor including a set of cores and a distributed memory unit, the set of cores including first and second cores, the distributed memory unit including a set of memory nodes, the set of memory nodes including a first memory node coupled to the first core and a second memory node coupled to the second core, the method comprising: processing one or more instructions of a first thread on the first core, wherein the one or more instructions of the first thread include one or more producer instructions, and wherein processing the one or more producer instructions includes storing, in the first memory node, data shared by the first thread and a second thread; in parallel with processing the one or more instructions of the first thread on the first core, processing one or more first instructions of the second thread on the second core; in response to the first core storing the shared data in the first memory node, sending the shared data to the second memory node; and after the second memory node stores the shared data, processing one or more second instructions of the second thread on the second core, wherein the one or more second instructions of the second thread include a consumer instruction, and wherein processing the consumer instruction comprises loading the shared data from the second memory node.

(23) The method of (22), comprising broadcasting the shared data in response to the first core storing the shared data in the first memory node, wherein broadcasting the shared data comprises sending the shared data to at least the second memory node.

(24) The method of (23), wherein the set of cores further includes a third core, wherein the set of memory nodes further includes a third memory node coupled to the third core, and wherein broadcasting the shared data further includes sending the shared data to the third memory node.

(25) The method of (23), wherein broadcasting the shared data includes routing the shared data over a network from the first memory node to other nodes of the set of memory nodes.

(26) The method of (25), wherein the distributed memory unit routes the shared data over the network in parallel with the first core processing the one or more instructions of the first thread and/or in parallel with the second core processing the one or more first instructions of the second thread.

(27) The method of (24), wherein the set of cores is a first set of cores, wherein the set of memory nodes is a first set of memory nodes, wherein the one or more instructions of the first thread include one or more instructions of an iteration of a first loop, wherein the multicore processor further includes a second set of cores, wherein the distributed memory unit further includes a second set of memory nodes coupled to the second set of cores, and wherein the method further comprises: processing one or more instructions of iterations of a second loop on the second set of cores while the first core processes the one or more instructions of the iteration of the first loop.

(28) The method of (23), wherein the broadcasting of the shared data occurs in parallel with the first core processing the one or more instructions of the first thread and/or in parallel with the second core processing the one or more first instructions of the second thread.

(29) The method of (22), wherein storing the shared data of the one or more producer instructions in the first memory node comprises storing data of a store instruction in the first memory node, and wherein sending the shared data to the second memory node in response to the first core storing the shared data in the first memory node comprises sending the data of the store instruction to the second memory node in response to the first core storing the data of the store instruction in the first memory node.

(30) The method of (22), wherein storing the shared data of the one or more producer instructions in the first memory node comprises storing data of a synchronization instruction in the first memory node, and wherein sending the shared data to the second memory node in response to the first core storing the shared data in the first memory node comprises sending the data of the synchronization instruction to the second memory node in response to the first core storing the data of the synchronization instruction in the first memory node.

(31) The method of (22), wherein the one or more producer instructions include a store instruction and a subsequent synchronization instruction, wherein storing the shared data of the one or more producer instructions in the first memory node comprises storing data of the store instruction and data of the subsequent synchronization instruction in the first memory node, and wherein sending the shared data to the second memory node in response to the first core storing the shared data in the first memory node comprises sending the data of the store instruction and the data of the subsequent synchronization instruction to the second memory node in response to the first core storing the data of the subsequent synchronization instruction in the first memory node.

(32) The method of (22), wherein the multicore processor further includes a cache-memory hierarchy, wherein the distributed memory unit is coupled to the cache-memory hierarchy, and wherein the method comprises accessing the first memory node as a lowest level of the cache-memory hierarchy during processing of a first of the one or more instructions of the first thread.

(33) The method of (32), wherein the method comprises accessing a level-one cache as a lowest level of the cache-memory hierarchy during processing of a second of the one or more instructions of the first thread.

(34) The method of (22), wherein sending the shared data to the second memory node comprises sending the shared data to the second memory node prior to the second core processing the one or more second instructions of the second thread.

(35) The method of (22), wherein processing the one or more instructions of the first thread includes processing instructions of a first iteration of a loop, and wherein processing the one or more first and/or second instructions of the second thread includes processing instructions of a second iteration of the loop.

(36) A multicore processor, comprising: a set of cores configured to execute instructions of a set of threads in parallel, the set of cores including: a first core configured to execute instructions of a first thread of the set of threads, and a second core configured to execute instructions of a second thread of the set of threads, one or more instructions of the second thread being data-dependent on shared data produced by one or more instructions of the first thread; and a distributed memory unit, including: a set of memory nodes, and a set of interconnects, wherein the set of memory nodes and the set of cores are coupled together, wherein the set of interconnects and the set of memory nodes are coupled together to form a ring network, and wherein the ring network is configured to broadcast the shared data to the set of memory nodes in response to the first core storing the shared data in a first of the memory nodes.

(37) A method, comprising: determining a value corresponding to parallel execution of multithreaded code on a multicore processor configured to send shared data from a first thread to a second thread in response to the first thread producing the shared data, wherein the multithreaded code implements a sequential portion of a program; selecting the sequential portion of the program for parallelization based, at least in part, on the determined value; and generating compiled code for the program, the compiled code including the multithreaded code corresponding to the sequential portion of the program.

(38) The method of (37), wherein the value corresponding to parallel execution of the multithreaded code comprises a time period elapsed during the parallel execution, a number of clock cycles of the multicore processor elapsed during the parallel execution, an amount of energy dissipated by the multicore processor during the parallel execution, and/or an amount of power dissipated by the multicore processor during the parallel execution.

(39) The method of (37), wherein determining the value corresponding to parallel execution of the multithreaded code comprises generating the multithreaded code implementing the sequential portion of the program, and simulating parallel execution of the multithreaded code on the multicore processor.

(40) The method of (39), wherein simulating parallel execution of the multithreaded code comprises: obtaining a trace of execution of the multithreaded code, and using the trace to perform a trace-driven simulation and/or an event-driven simulation of the parallel execution of the multithreaded code on the multicore processor.

(41) The method of (39), wherein simulating parallel execution of the multithreaded code on the multicore processor comprises simulating: a distributed memory unit of finite size coupled to cores of the multicore processor and configured to store the shared data produced by the first thread, and eviction of the shared data from the distributed memory unit prior to consumption of the shared data by the second thread.

(42) The method of (39), wherein simulating parallel execution of the multithreaded code on the multiprocessor comprises performing an execution-driven simulation of at least a portion of the multicore processor.

(43) The method of (37), wherein determining the value corresponding to parallel execution of the multithreaded code comprises executing the multithreaded code on the multicore processor.

(44) The method of (37), wherein determining the value corresponding to parallel execution of the multithreaded code comprises estimating the value based, at least in part, on one or more attributes of the multicore processor.

(45) The method of (44), wherein estimating the value based, at least in part, on one or more attributes of the multicore processor comprises estimating the value based, at least in part, on a latency of communication between cores of the multicore processor.

(46) The method of (37), further comprising selecting the sequential portion of the program for parallelization based, at least in part, on an attribute of the multithreaded code corresponding to the sequential portion, wherein the attribute comprises a number of sequential segments in the multithreaded code, a number of instructions in sequential segments in the multithreaded code, and/or a number of instructions outside sequential segments in the multithreaded code.

(47) The method of (37), wherein the sequential portion of the program comprises a loop, and wherein threads of the multithreaded code correspond to iterations of the loop.

(48) The method of (37), further comprising performing one or more code transformations on the multithreaded code, the one or more code transformations including code scheduling, method inlining, loop unrolling, parallel reduction, scalar expansion, scalar renaming, and/or loop splitting.

(49) The method of (37), further comprising transforming the multithreaded code to reduce a number of instructions in a sequential segment of the multithreaded code.

(50) The method of (37), further comprising transforming the multithreaded code to split one or more sequential segments of the multithreaded code.

(51) At least one computer-readable storage medium storing computer-executable instructions which, when executed by a processing circuit, cause the processing circuit to perform a method comprising: determining a value corresponding to parallel execution of multithreaded code on a multicore processor configured to send shared data from a first thread to a second thread in response to the first thread producing the shared data, wherein the multithreaded code implements a sequential portion of a program; selecting the sequential portion of the program for parallelization based, at least in part, on the determined value; and generating compiled code for the program, the compiled code including the multithreaded code corresponding to the sequential portion of the program.

(52) A system comprising: at least one processing circuit; and at least one storage medium storing instructions which, when executed by the at least one processing circuit, cause the at least one processing circuit to perform a method including: determining a value corresponding to parallel execution of multithreaded code on a multicore processor configured to send shared data from a first thread to a second thread in response to the first thread producing the shared data, wherein the multithreaded code implements a sequential portion of a program; selecting the sequential portion of the program for parallelization based, at least in part, on the determined value; and generating compiled code for the program, the compiled code including the multithreaded code corresponding to the sequential portion of the program.

(53) A method, comprising: identifying sequential loops in a program; generating portions of multithreaded code implementing the respective sequential loops; simulating execution of the portions of multithreaded code on a multicore processor configured to send shared data from a first thread to a second thread in response to the first thread producing the shared data, wherein simulating the execution of the portions of multithreaded code comprises determining simulated durations of execution of the portions of multithreaded code on the multicore processor; selecting one or more of the sequential loops for parallelization based, at least in part, on the simulated durations of execution of the portions of multithreaded code corresponding to the sequential loops; and generating compiled code for the program, the compiled code including the multithreaded code corresponding to the selected sequential loops.

(54) The method (53), wherein generating portions of multithreaded code implementing the respective sequential loops comprises analyzing a first of the sequential loops to identify dependences within the first sequential loop.

(55) The method of (54), wherein generating portions of multithreaded code implementing the respective sequential loops further comprises transforming a first portion of the multithreaded code corresponding to the first sequential loop to reduce inter-thread dependences in the first portion of multithreaded code.

(56) The method of (53), wherein simulating execution of the portions of multithreaded code on the multicore processor comprises obtaining a trace of execution of the multithreaded code, and using the trace to perform a trace-driven simulation and/or an event-driven simulation of parallel execution of the multithreaded code on the multicore processor.

(57) The method of (53), wherein selecting the one or more sequential loops for parallelization comprises: creating a graph, wherein nodes of the graph correspond to the respective sequential loops of the program, wherein edges of the graph represent relationships between the sequential loops; associating the nodes of the graph with the simulated durations of execution of the portions of multithreaded code corresponding to the respective sequential loops; and selecting the one or more sequential loops for parallelization based on analysis of the graph.

(58) At least one computer-readable storage medium storing computer-executable instructions which, when executed by a processing circuit, cause the processing circuit to perform a method comprising: identifying sequential loops in a program; generating portions of multithreaded code implementing the respective sequential loops; simulating execution of the portions of multithreaded code on a multicore processor configured to send shared data from a first thread to a second thread in response to the first thread producing the shared data, wherein simulating the execution of the portions of multithreaded code comprises determining simulated durations of execution of the portions of multithreaded code on the multicore processor; selecting one or more of the sequential loops for parallelization based, at least in part, on the simulated durations of execution of the portions of multithreaded code corresponding to the sequential loops; and generating compiled code for the program, the compiled code including the multithreaded code corresponding to the selected sequential loops.

(59) A system comprising: at least one processing circuit; and at least one storage medium storing instructions which, when executed by the at least one processing circuit, cause the at least one processing circuit to perform a method including: identifying sequential loops in a program; generating portions of multithreaded code implementing the respective sequential loops; simulating execution of the portions of multithreaded code on a multicore processor configured to send shared data from a first thread to a second thread in response to the first thread producing the shared data, wherein simulating the execution of the portions of multithreaded code comprises determining simulated durations of execution of the portions of multithreaded code on the multicore processor; selecting one or more of the sequential loops for parallelization based, at least in part, on the simulated durations of execution of the portions of multithreaded code corresponding to the sequential loops; and generating compiled code for the program, the compiled code including the multithreaded code corresponding to the selected sequential loops.

It should be understood that various combinations of the structures, components, materials and/or elements, in addition to those specifically shown in the drawings and/or described in the present disclosure, are contemplated and are within the scope of the present disclosure. Reference throughout the specification to "one embodiment" or "an embodiment" or "some embodiments" means that a particular feature, structure, material, or characteristic described in connection with the embodiment(s) is included in at least one embodiment of the present invention, but not necessarily in all embodiments. Consequently, appearances of the phrases "in one embodiment," "in an embodiment," or "in some embodiments" in various places throughout the disclosure are not necessarily referring to the same embodiment. Furthermore, the particular features, structures, materials, or characteristics can be combined in any suitable manner in one or more embodiments.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" or the phrase "and/or" is used in reference to a list of two or more items, that word covers all of the following interpretations of the word: any of the items in the list; all of the items in the list; and any combination of the items in the list.

Use of ordinal terms such as "first," "second," "third," etc., in the claims to modify a claim element does not by itself connote any priority, precedence, or order of one claim element over another or any temporal order in which acts of a method may be performed. Ordinal terms are used merely as labels to distinguish one claim element having a certain name from another element having a same name (but for use of the ordinal term), to distinguish the claim elements.

What is claimed is:

1. A multicore processor, comprising:
a set of cores executing threads corresponding to multiple iterations of a loop, the set of cores including first and second cores; and
a distributed memory unit including a set of memory nodes configured to route shared data among memory nodes in the set based on an order of execution of the threads on cores to which the memory nodes are coupled, the set of memory nodes including a first memory node coupled to the first core and a second memory node coupled to the second core;
wherein the first core is configured to process one or more first instructions of a first thread corresponding to a first iteration of a loop, the one or more first instructions of the first thread including one or more first producer instructions, and wherein processing the one or more first producer instructions includes storing, in the first memory node, first shared data shared by the first thread and a second thread corresponding to a second iteration of the loop, and
wherein the second core is configured to process one or more second instructions of the second thread corresponding to the second iteration of the loop in parallel with the first core processing the one or more first instructions of the first thread corresponding to the first iteration of a loop, the one or more second instructions of the second thread including one or more second producer instructions, and wherein processing the one or more second producer instructions includes storing, in the second memory node, second shared data shared by the second thread and another thread,
wherein the distributed memory unit is configured to route the first shared data and the second shared data among the set of memory nodes, wherein routing the first shared data and the second shared data comprises:
sending the first shared data from the first memory node to the second memory node in response to the first core storing the first shared data in the first memory node,
receiving, at the second memory node, the first shared data from the first memory node,
storing the first shared data in the second memory node, and
in response to 1) the second core storing the second shared data in the second memory node and 2) a determination that both the second shared data obtained from the second core and the first shared data obtained from the first memory node are available at the second memory node, sending the first shared data from the second memory node to a third memory node of the set of memory nodes prior to sending the second shared data from the second memory node to the third memory node,
wherein the second core is configured to process one or more third instructions of the second thread after the second memory node stores the first shared data sent by the distributed memory unit, wherein the one or more third instructions of the second thread include a consumer instruction, and wherein processing the consumer instruction includes loading the first shared data from the second memory node, and
wherein processing the one or more first instructions of the first thread comprises processing a synchronization instruction, processing the synchronization instruction comprising storing synchronization data in the first memory node, and wherein the distributed memory unit is configured to route the synchronization data to the second memory node.

2. The multicore processor of claim 1, wherein the set of cores further includes a third core, and wherein the third memory node is coupled to the third core.

3. The multicore processor of claim 1, wherein the distributed memory unit further includes interconnects, wherein the interconnects and the set of memory nodes are coupled together to form a network, and wherein the network is configured to perform the routing of the first shared data from the first memory node to other nodes of the network and the routing of the second shared data from the second memory node to the other nodes of the network.

4. The multicore processor of claim 3, wherein the network comprises a ring network, wherein the ring network couples the set of memory nodes in a ring, and wherein the ring network is configured to route the first shared data around the ring in a single direction.

5. The multicore processor of claim 4, wherein the ring network is configured to route the first shared data around the ring in parallel with the first core processing the one or more first instructions of the first thread and/or in parallel with the second core processing the one or more second instructions of the second thread.

6. The multicore processor of claim 3, wherein the network is configured to perform the routing of the first shared data in parallel with the first core processing the one or more first instructions of the first thread and/or in parallel with the second core processing the one or more second instructions of the second thread.

7. The multicore processor of claim 1, wherein the multicore processor further includes a cache-memory hierarchy, and wherein the distributed memory unit is coupled to the cache-memory hierarchy.

8. The multicore processor of claim 1, wherein sending the first shared data to the second memory node comprises sending the first shared data to the second memory node prior to the second core executing the one or more second instructions of the second thread.

9. The multicore processor of claim 1, wherein the one or more first instructions corresponding to the first iteration of the loop are automatically extracted from sequential code and converted into parallel code by a compiler.

10. The multicore processor of claim 1, wherein the multicore processor further includes a clock component configured to produce a clock signal to synchronize processing of components of the first core, and wherein the distributed memory unit is configured to send the first shared data from the first memory node to the second memory node in a time period that spans between 1 and 10 periods of the clock signal, between 1 and 8 periods of the clock signal, between 1 and 6 periods of the clock signal, between 1 and 4 periods of the clock signal, between 1 and 2 periods of the clock signal, or 1 period of the clock signal.

11. A method of processing instructions in parallel on a multicore processor, the multicore processor including a set of cores executing threads corresponding to multiple iterations of a loop and a distributed memory unit, the set of cores including first and second cores, the distributed memory unit including a set of memory nodes configured to route shared data among memory nodes in the set based on an order of execution of the threads on cores to which the memory nodes are coupled, the set of memory nodes including a first memory node coupled to the first core and a second memory node coupled to the second core, the method comprising:
  processing one or more first instructions of a first thread corresponding to a first iteration of a loop on the first core, wherein the one or more first instructions of the first thread include one or more first producer instructions, and wherein processing the one or more first producer instructions includes storing, in the first memory node, first shared data shared by the first thread and a second thread corresponding to a second iteration of the loop;
  in parallel with processing the one or more first instructions of the first thread on the first core, processing one or more second instructions of the second thread corresponding to the second iteration of a loop on the second core, the one or more second instructions of the second thread including one or more second producer instructions, and wherein processing the one or more second producer instructions includes storing, in the second memory node, second shared data shared by the second thread and another thread;
  routing, via the distributed memory unit, the first shared data and the second shared data among the set of memory nodes, wherein routing the first shared data and the second shared data comprises:
    sending the first shared data from the first memory node to the second memory node in response to the first core storing the first shared data in the first memory node,
    receiving, at the second memory node, the first shared data from the first memory node,
    storing the first shared data in the second memory node, and
    in response to 1) the second core storing the second shared data in the second memory node and 2) a determination that both the second shared data obtained from the second core and the first shared data obtained from the first memory node are available at the second memory node, sending the first shared data from the second memory node to a third memory node of the set of memory nodes prior to sending the second shared data from the second memory node to the third memory node; and
  after the second memory node stores the first shared data, processing one or more third instructions of the second thread on the second core, wherein the one or more third instructions of the second thread include a consumer instruction, and wherein processing the consumer instruction comprises loading the first shared data from the second memory node,
  wherein processing the one or more first instructions of the first thread comprises processing a synchronization instruction, processing the synchronization instruction comprising storing synchronization data in the first memory node, and wherein the synchronization data is routed to the second memory node via the distributed memory unit.

12. The method of claim 11, wherein the set of cores further includes a third core, and wherein the third memory node is coupled to the third core.

13. The method of claim 11, wherein routing the first shared data includes routing the first shared data over a network from the first memory node to other nodes of the set of memory nodes and routing the second shared data includes routing the second shared data over the network from the second memory node to the other nodes of the set of memory nodes.

14. The method of claim 13, wherein the distributed memory unit routes the first shared data over the network in parallel with the first core processing the one or more first instructions of the first thread and/or in parallel with the second core processing the one or more second instructions of the second thread.

15. The method of claim 11, wherein storing the first shared data of the one or more first producer instructions in the first memory node comprises storing data of a store instruction in the first memory node, and wherein sending the first shared data to the second memory node in response to the first core storing the first shared data in the first memory node comprises sending the data of the store instruction to the second memory node in response to the first core storing the data of the store instruction in the first memory node.

16. The method of claim 11, wherein the multicore processor further includes a cache-memory hierarchy, wherein the distributed memory unit is coupled to the cache-memory hierarchy, and wherein the method comprises accessing the first memory node as a lowest level of the cache-memory hierarchy during processing of a first of the one or more first instructions of the first thread.

17. The method of claim 11, wherein sending the first shared data to the second memory node comprises sending the first shared data to the second memory node prior to the second core processing the one or more second instructions of the second thread.

* * * * *